United States Patent [19]
Inbar

[11] Patent Number: 6,119,380
[45] Date of Patent: Sep. 19, 2000

[54] TRANSPARENCY VIEWING APPARATUS

[75] Inventor: Dan Inbar, Haifa, Israel

[73] Assignee: SmartLight Ltd., Yokneam Eur, Israel

[21] Appl. No.: 08/981,103

[22] PCT Filed: Jun. 20, 1996

[86] PCT No.: PCT/IL96/00023

§ 371 Date: Dec. 17, 1997

§ 102(e) Date: Dec. 17, 1997

[87] PCT Pub. No.: WO91/10152

PCT Pub. Date: Jul. 11, 1991

Related U.S. Application Data

[60] Provisional application No. 60/001,814, Aug. 1, 1995.

[30] Foreign Application Priority Data

Jun. 21, 1995 [IL] Israel ............................ 114258

[51] Int. Cl.$^7$ .................................................. G02B 27/02
[52] U.S. Cl. ................................ 40/361; 40/448; 345/87
[58] Field of Search ................................ 40/361, 366, 367, 40/448, 563, 564; 362/97; 345/87, 89, 102, 147

[56] References Cited

U.S. PATENT DOCUMENTS

| | | | |
|---|---|---|---|
| 1,338,532 | 4/1920 | Root ........................................... | 40/563 |
| 1,988,654 | 1/1935 | Haag . | |
| 2,436,162 | 2/1948 | Cadenas . | |
| 4,004,360 | 1/1977 | Hammond . | |
| 4,267,489 | 5/1981 | Morohashi .............................. | 40/367 X |
| 4,373,280 | 2/1983 | Armfield . | |
| 4,510,708 | 4/1985 | Pokrinchak . | |
| 4,637,150 | 1/1987 | Geluk . | |
| 4,775,918 | 10/1988 | Snyder . | |
| 4,908,876 | 3/1990 | Deforest et al. . | |
| 5,251,392 | 10/1993 | McManigal ............................ | 40/564 X |
| 5,313,726 | 5/1994 | Yaniv et al. . | |
| 5,426,879 | 6/1995 | Hecker .................................. | 40/564 X |

FOREIGN PATENT DOCUMENTS

| | | |
|---|---|---|
| 3331762 | 3/1985 | Germany . |
| 39 33 988 A1 | 4/1991 | Germany . |
| WO 89/02096 | 3/1989 | WIPO . |
| WO91/10152 | 7/1991 | WIPO . |
| WO93/01564 | 1/1993 | WIPO . |
| WO95/14949 | 6/1995 | WIPO . |
| WO95/14950 | 6/1995 | WIPO . |

*Primary Examiner*—Brian K. Green
*Attorney, Agent, or Firm*—Fenster & Company Patent Attorneys, Ltd.

[57] ABSTRACT

A transparency viewing device comprising:

at least one interior reflective surface;

a light transmitting viewing surface adapted to accommodate a transparency to be viewed;

a light source which provides backlight illumination to the viewing surface, thereby creating a viewing field having a transparency-bearing region;

at least one masking element mounted and configured for movement with respect to the viewing surface, which masks an adjustable area of the viewing field leaving a field of view including at least part of the transparency bearing region unmasked; and at least one reflective element, additional to the interior reflective surface, attached to the masking element such that when the masking element moves the reflective element moves together with the masking element and which reflective element directs at least part of the light from the masked area to the field of view in an amount and in a direction such that the backlighting of the unmasked region is substantially changed as a function of the movement of the masking element.

22 Claims, 13 Drawing Sheets

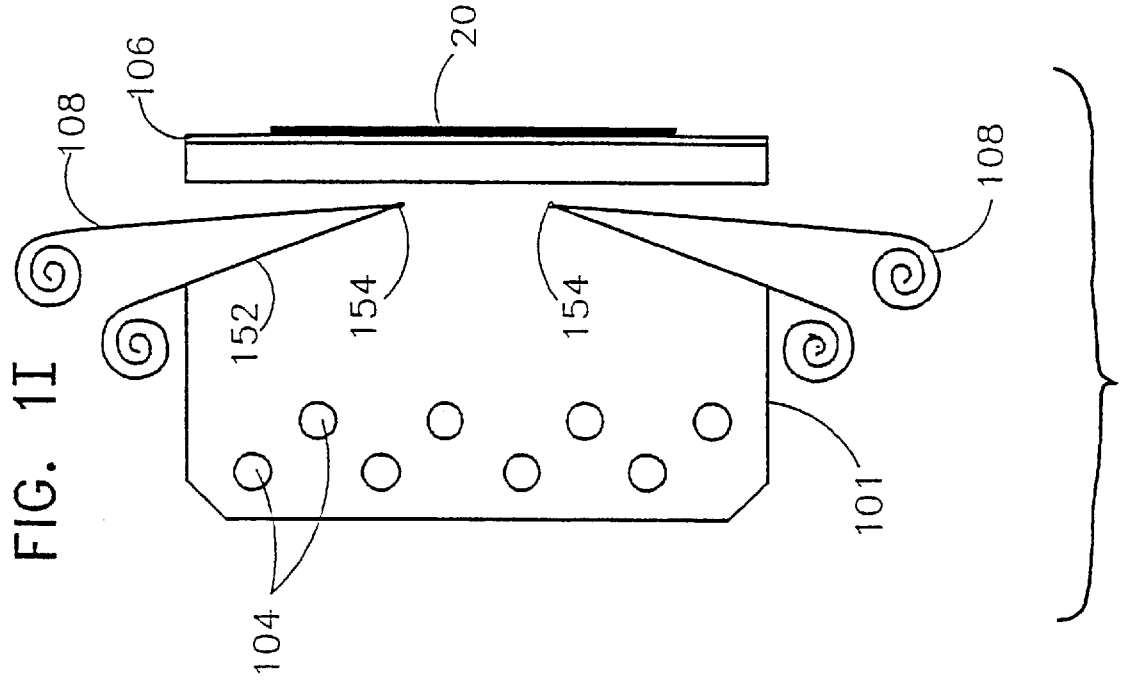
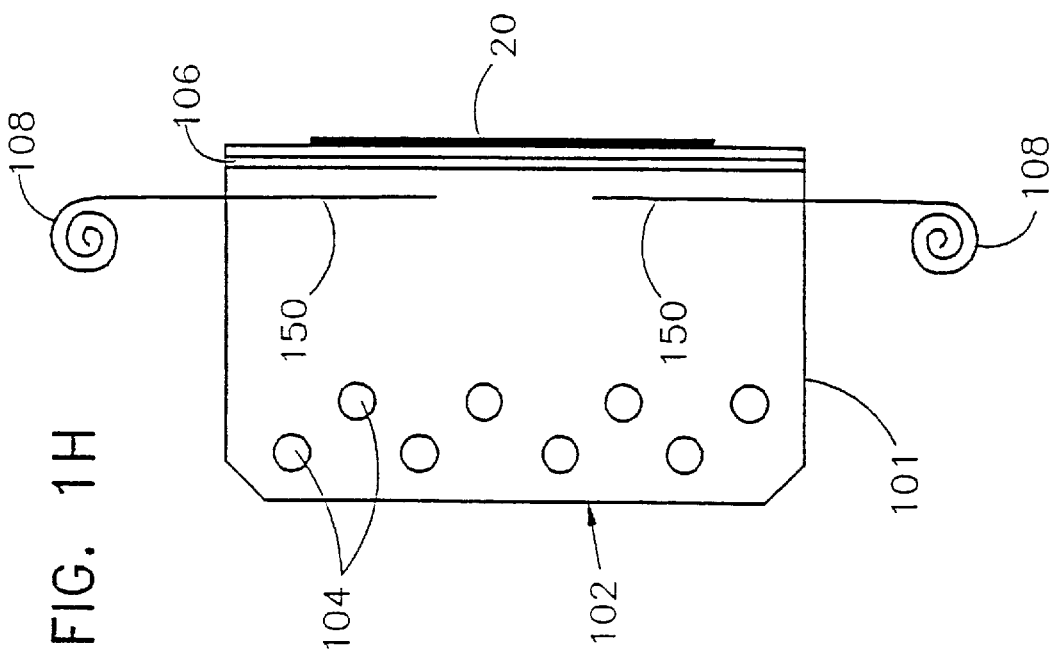

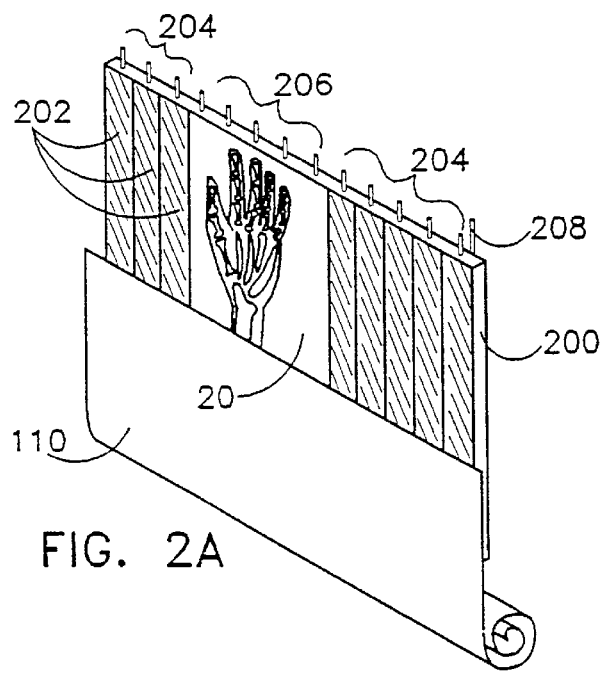
FIG. 2A
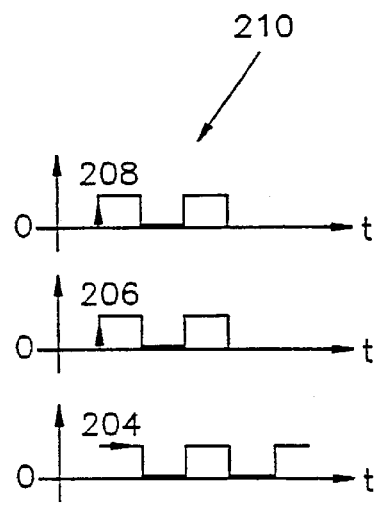
FIG. 2B
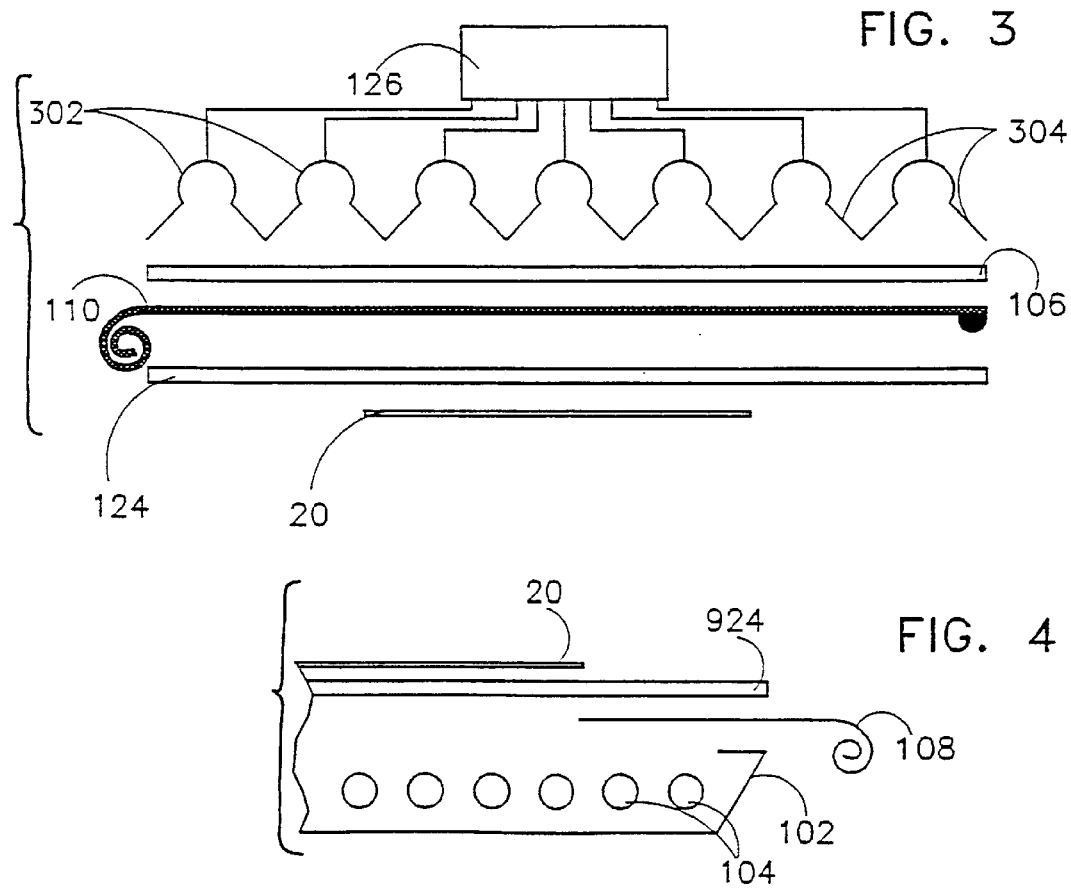
FIG. 3
FIG. 4

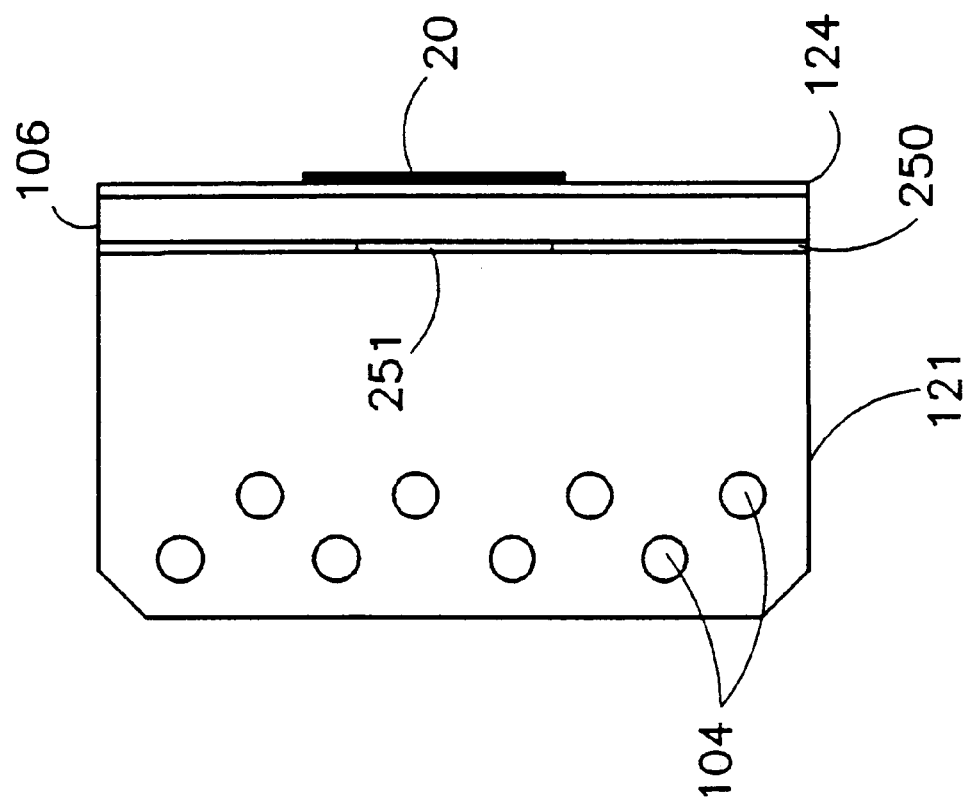

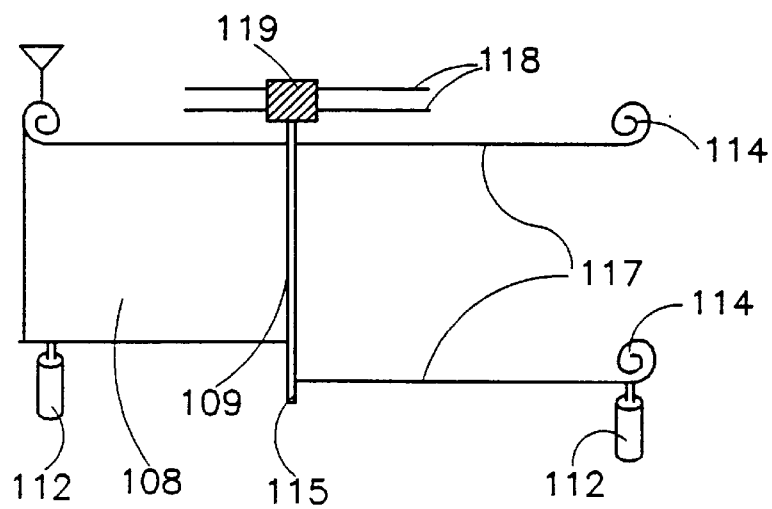
FIG. 8A
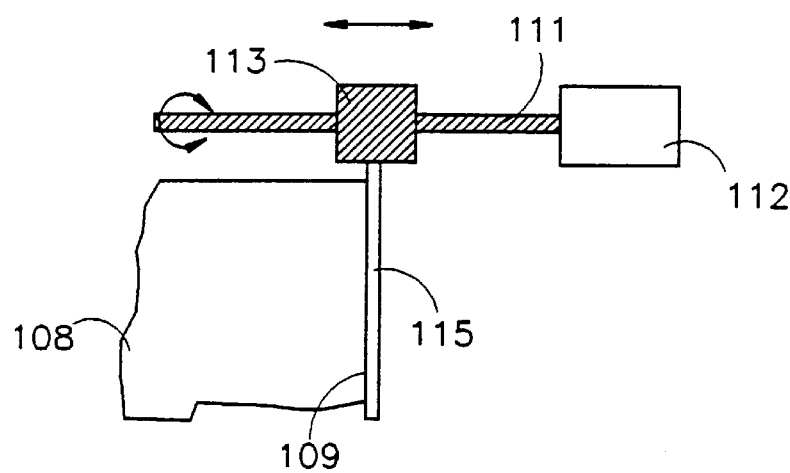
FIG. 8B
FIG. 8C
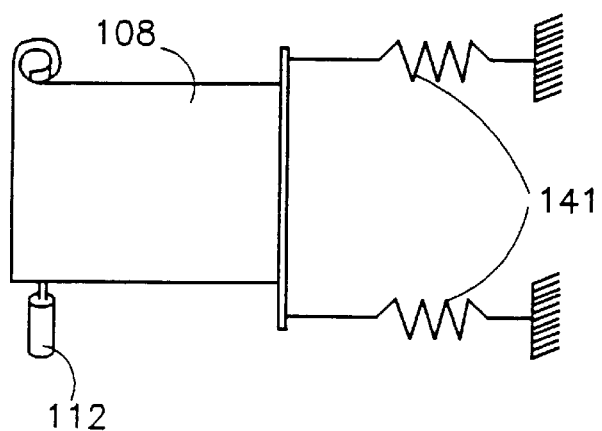

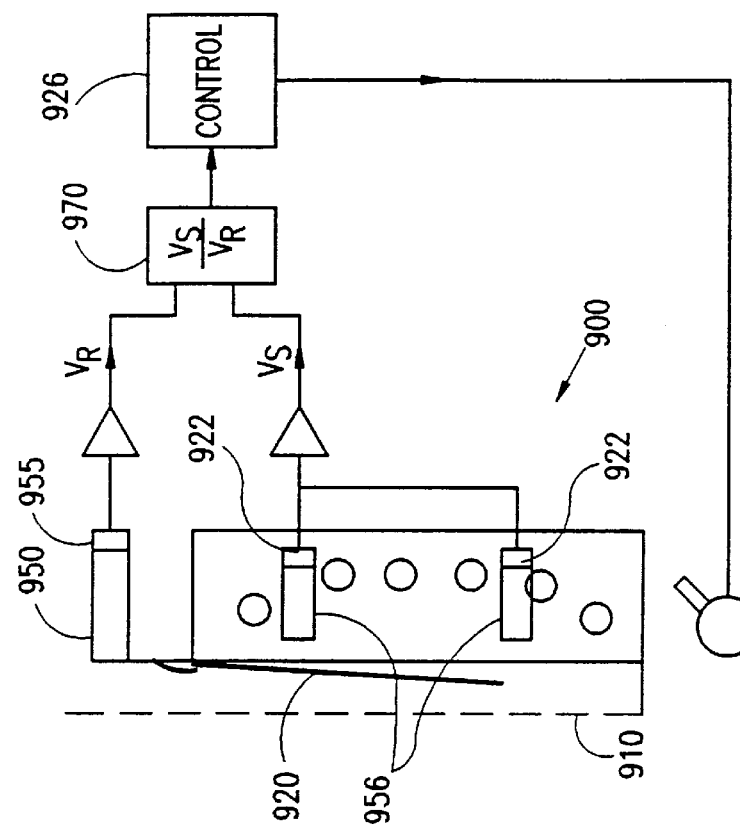
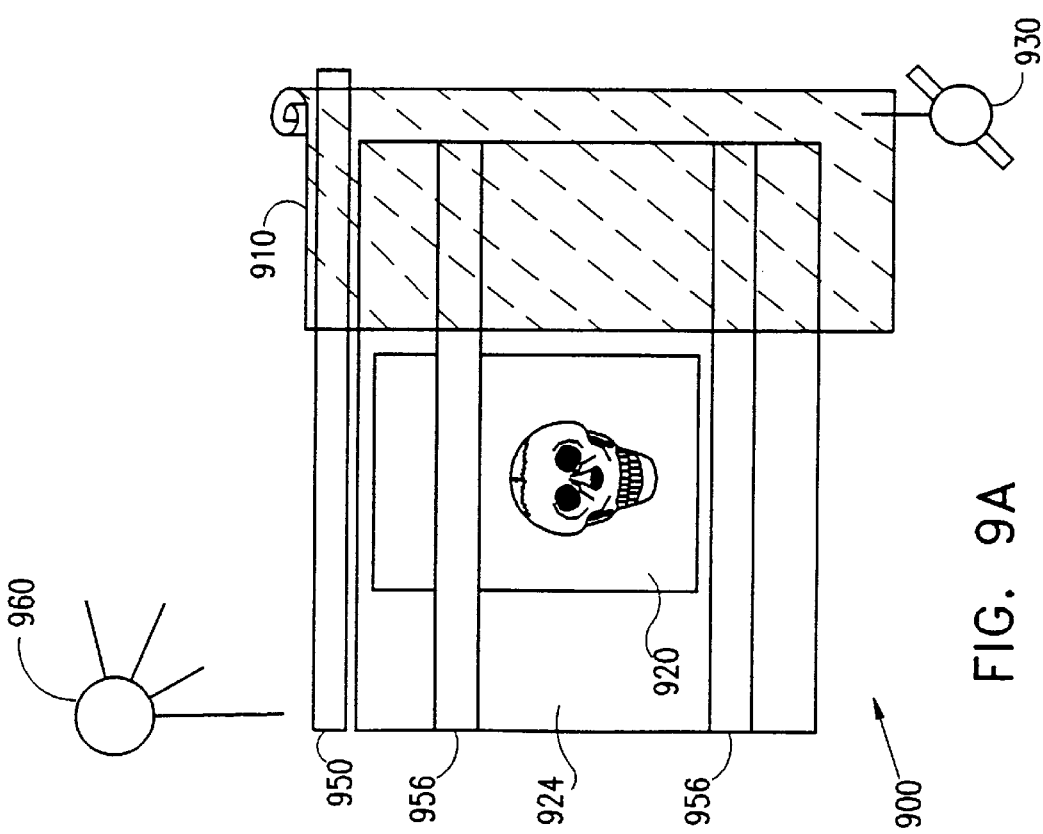
FIG. 9B
FIG. 9A

TRANSPARENCY VIEWING APPARATUS

RELATED APPLICATION

This application is a U.S. national stage application of PCT/IL96/00023 filed Jun. 20 1996. It also claims the benefit of U.S. provisional application 60/001,814 filed Aug. 1, 1995.

FIELD OF THE INVENTION

The present invention relates generally to a transparencies viewing device and, more particularly, to apparatus for holding and illuminating X-ray transparencies and the like.

BACKGROUND OF THE INVENTION

Medical X-ray transparencies are usually examined by placing them over the viewing surface of a device commonly referred to as an illuminator. Conventional illuminators normally comprise a box-like structure enclosing fluorescent lighting tubes behind a light diffusing plate defining the display area. Commonly, transparencies are retained on the surface of the viewing surface by pushing the upper edge of the transparencies under spring-loaded film-holder clips located along the top edge of the viewing surface.

Standard size illuminators have a viewing surface 17 inches high and 14 inches or multiples of 14 inches (i.e. 28 inches or 56 inches) wide. Usually, each 14 inch width of viewing surface has its own fluorescent tubes and control switch. Such viewing surface enables the viewing of standard size X-ray films which measure up to 17 inches by 14 inches.

The sections of the viewing surface not covered by transparencies need not be illuminated. This eliminates unnecessary glare from areas outside the transparency. When transparencies smaller than 14 inches by 17 inches are to be examined, they are typically retained on the display area in the same manner as full size transparencies, i.e., suspending them by means of the film-holders along the top of the viewer. This leaves a portion of the display area surrounding the transparencies fully illuminated, with the resulting glare detracting from the visual perception of the person trying to study the transparency and assess the information it contains.

Moreover, in many instances, the region of the display area which is of highest interest to the viewer is quite dense. Thus, viewing of the region and assessment of information therefrom may be particularly cumbersome and difficult.

Often transparencies contain several very transparent areas, and, frequently, radiologists have to examine overexposed transparencies. In these cases, considerable glare emanates through areas of the transparencies themselves.

Attempts have been made in the past to provide viewing devices for X-ray transparencies which shield the eyes of the observer from light other than that passing through the transparencies; to obscure light in parts of the transparencies, and to reduce the contrast in transparencies when so required.

U.S. Pat. No. 1,988,654 to Haag discloses a light box which incorporates two manually movable curtains for masking all of the light-transmitting surfaces of a diffuser up to the edges of a transparency.

U.S. Pat. No. 2,436,162 to Cadenas discloses an X-ray viewer having a masking arrangement incorporating a plurality of hinge-connected opaque masks which may be manually pivoted relative to each other to expose all or only selected parts of an X-ray transparency.

U.S. Pat. No. 4,004,360 to Hammond is directed to a self-masking viewing device which purports to automatically obscure areas of the viewing screen not occupied by the X-ray transparency. In the disclosed device, the screen is provided with a multiplicity of holes which may be selectively blocked by shutters or opened for the passage of light. The interior of the device is connected to a vacuum source which functions to hold the film against the front surface of the device.

The vacuum functions, in addition, to close the shutters connected with those holes not covered by the transparencies, so that passage of light through such holes is prevented. Air cannot pass through those holes in registry with the transparencies and, thus, the shutters associated with the covered holes remain open for the passage of light. The device described is unsuitable for critical inspection of X-ray transparencies since the presence of holes and shutters in the areas in registry with the transparencies creates a pattern behind the transparencies which interferes with the ability to accurately read them.

U.S. Pat. No. 4,373,280 to Armfield discloses an X-ray viewing plate having a cross bar for supporting transparencies at a central portion of the screen. A series of shades is provided which may be manually activated to obscure selected parts of the illuminated surface.

U.S. Pat. No. 4,510,708 to Porkinchak discloses an X-ray viewing device which includes a series of masks on an elongated scroll. In a specific embodiment of the invention, the scroll is moved by a motor on a pair of feed rolls. The masks are sized to correspond with stock sizes of X-ray transparencies. The apparatus has a dimensional sensing mechanism which aligns a selected mask with a positioned transparency automatically in accordance with the sensed dimension. The transparencies are inserted into a filmholder. The widthwise sensing function is performed by a series of levers or fingers positioned to engage an edge of the film.

U.S. Pat. No. 4,637,150 to Geluk describes a system in which a cathode ray tube is used as a light source and the light emitted by this source is modulated in accordance with the stored density of a transparency. This system is impractical due to the limited sizes and associated light intensity outputs of CRTs for this type of illuminator.

U.S. Pat. No. 4,908,876 to Deforest et al., describes, inter alia, a transparency viewer using projection lens to project a light source for backilluminating a transparency.

U.S. Pat. No. 5,313,726 to Yaniv et al., describes a transparency viewer in which a light source, mounted in a reflecting housing, is used to back-illuminate a transparency.

German Patent Application DE 33 31 762 A1 describes an array type electrochromatic illuminator in which backlighting selectively illuminates portions of a viewing surface in response to the application of voltage to horizontal and vertical strip conductors on opposite faces of an electrochromatic material placed between the source of illumination and the viewing surface.

U.S. patent application Ser. Nos. 07/861,982 and 08/175,372 to Inbar et. al., now U.S. Pat. No. 5,430,964, and PCT Publication WO 93/01564 and WO 91/10152, the disclosures of which are incorporated herein by reference, disclose self-masking transparency viewing apparatus having a mask-pattern generating device which may be an electrically-controlled Liquid Crystal Array (LCA). In addition, there is provided a transparency detection means, such as optical sensors which recognize optical properties, for example, attenuation, on the display area including images within the transparencies and the face of the transparencies themselves. The detection data is transferred to a system control unit which drives the LCA to produce a complementary masking pattern in conformity with the displayed transparencies, masking all other portions of the display area.

From the above-referenced prior art, it will be understood that there has not heretofore been available a device capable of producing an illumination field in conformity with the displayed image-carrying transparencies, with no interposing masking means or apparatus between the light source and the illuminated portions of the transparencies, and which does not require operator assistance to recognize and set the transparency field, or parts thereof, to be illuminated and which is further capable of automatically intensifying the illumination field projected through the displayed image-carrying sections of the transparency.

SUMMARY OF THE INVENTION

It is, therefore, an object of the present invention to improve prior art transparency viewing devices with mechanical illumination masking means or apparatus, by automating the recognition and setting of the transparency field, or parts thereof, to be illuminated and further automating the intensification of light projected through the transparency field or parts thereof.

In accordance with one aspect of the invention, the automation comprises detection of the insertion of a transparency, or delineation of the area occupied by the transparency, or recognition of boundaries of the transparency, or recognition of boundaries of the image-carrying portion of the transparency, or any combination of the above.

Preferably, the automation also comprises movement of masking means, in accordance with the information obtained by the above-mentioned detection. The resulting device, in accordance with one aspect of the invention, comprises a mechanical illumination masking means and detection means, automatically producing an intensified illumination field in conformity with the displayed image-carrying transparencies.

It is an object of some aspects of the present invention to provide enhancement of visual perception of an image-carrying transparency by automatic masking of the display area in conformity with the displayed transparencies, including a mask pattern generating device which is not interposed between the illumination source and the illuminated portion of the displayed transparencies.

It is an object of the some aspects of the present invention to provide a transparency detection means, capable of recognizing and of mapping the optical image contained in the transparencies, which is not interposed between the light source and the illuminated portion of the displayed transparencies, but which is contained between the transparency plane and the illumination source.

It is an object of some aspects of the present invention to provide a reflecting means, capable of re-utilizing light from masked portions and reflecting it through the unmasked portions of the displayed transparencies, thus intensifying the illumination field associated therewith.

It is an object of some aspects of the present invention to provide a light box for viewing transparencies which utilizes one or a small number of high intensity high efficiency light sources.

The present invention comprises, according to one aspect thereof, an improved transparency viewing apparatus, more particularly, a viewing device for X-ray films or the like, characterized in that an appropriate field of the viewing area is illuminated automatically, in response to the placement of a transparency on the viewing apparatus. The intensity of the illumination is inversely related to the size of the field of the viewing area with changes in size automatically corresponding to increases in illumination intensity.

There is thus provided, in accordance with a preferred embodiment of the invention, a transparency viewing device including:

at least one interior reflective surface;

a light transmitting viewing surface which accommodates a transparency to be viewed;

a light source which provides backlight illumination to the viewing surface, thereby creating a viewing field having a transparency-bearing region;

at least one movable masking element which masks an area of said viewing field;

at least one additional reflective element associated with the movable masking element which directs light from said masked areas to said at least one interior reflective surface.

More particularly, the present invention is a transparency viewing device including an essentially conventional housing, a light fixture and a diffuser. The device includes means for detecting the insertion of a transparency, or means for delineating the area occupied by the transparency, or means for recognizing the transparency boundaries or determining boundaries of the image-carrying portion of the transparency, or any combination of the above. The device includes means for moving a masking mechanism into registry with the portions of the illumination area which are not occupied by the transparency and/or image-carrying parts of the transparency. The portions to be covered are determined based on control signals obtained by the detection means.

In accordance with a preferred embodiment of the invention, interior surfaces of the conventional housing are coated with a reflective material such as a mirror finish or a diffusive reflective coating.

In accordance with one aspect of the invention, there is provided a device for enhancing the visual perception of an image-carrying transparency, including a front surface for mounting of an image-carrying transparency. An arrangement is provided containing a movable masking apparatus visually aligned with the front surface. The transparency, or parts thereof, at the front surface, is back illuminated by a light source positioned for directing light through the unmasked portions of the front surface and through the transparency, or parts thereof, towards an observer. Added illumination is provided by re-utilizing a major portion of the light that does not pass through masked portions, by reflecting the light directed toward the masked portions of the front surface and re-reflecting at least part of it toward the unmasked portions of the front surface.

In accordance with one aspect of the invention, the apparatus includes an arrangement of motorized masking-elements such as movable opaque curtains. The structure of mechanical opaque curtains is well known in the art. For example, the curtain assembly may be in the form of flexible opaque material rolled around a motorized cylinder and including a rigid member attached to its leading edge.

In a preferred embodiment of this aspect of the invention, the movable opaque curtains are backpainted with a reflective coating that may comprise a mirror finish or a diffusing reflective coating. The reflective coating functions as a reflector to re-utilize light that may otherwise be absorbed by the curtain assembly. Preferably this reflected light is re-reflected by the reflecting back and side inner surfaces of the housing at least partly toward the unmasked portions of the front surface.

In an alternate embodiment of this aspect of the invention, the apparatus includes a reflective arrangement such as movable angled reflective curtains which may be in the form of flexible reflective material attached to the leading edge of the moving masking member, i.e., the moving opaque curtains. Preferably, the light reflected by the angled reflective curtains is recycled as in the previous aspect of the invention. The angled surface is believed to be more efficient in directing the reflected light toward the unmasked portions of the front surface.

In an alternative preferred embodiment of the invention, an addressable LCD diffuser is used to both mask the transparency (or a portion of the transparency) and to recycle the light originally directed toward the masked portions of the front surface. In this embodiment of the invention, a spatially addressable LC diffuser is placed between the source of illumination and front surface. Those portions of the front surface which are to be masked are made diffusing and the unmasked portion are made transparent. A simple diffuser is placed behind, or is part of, the front surface.

A major portion of the light which is directed toward the masked portions of the front surface is reflected back toward the reflecting interior of the housing and eventually, a portion of this light makes its way through the unmasked portions of the LCD. This has a two-fold benefit. First it increases the light efficiency of the system and results in increased lighting of the unmasked portion as described above. Second, it decreases the amount of light leaving the masked portions, thereby increasing the visibility of the unmasked portion of the transparency. Where subdued lighting in the masked portions is acceptable, a moving curtain is not needed.

There is therefore further provided, in accordance with a preferred embodiment of the invention, a transparency viewing device comprising:

at least one inner reflective surface;

a light transmitting viewing surface which accommodates a transparency to be viewed;

a light source which provides backlight illumination to the viewing surface, thereby creating a viewing field having a transparency-bearing region;

a masking element comprising an array of addressable liquid crystal elements having selectively light diffusing and light transmitting states which are operative to form a light diffusive mask surrounding at least a portion of the transparency bearing region, the addressable array being directly illuminated by the light source and being situated between the light source and the viewing surface, whereby light is directed from the masked diffusive areas toward the at least one inner reflective surface.

In a preferred embodiment of the invention, the transparencies are retained on the front surface of the device by a method commonly used in X-ray viewing devices e.g., by pushing the upper or lower edge of the transparencies under spring-loaded film-holder clips located along the top or bottom edge of the face plate. The masking arrangement comprises a plurality, preferably three (3), movable opaque curtains, two (2) of which move horizontally and cover vertical portions of the illuminating surface. The third opaque curtain moves vertically to block remaining portions of the illuminating surface from bottom to top, or top to bottom. One or more photosensing devices (e.g. a detector or an associated lightguide) are mounted on some or all of the movable opaque curtains.

In a preferred embodiment of the present invention, at least one photosensor is located at the edge of a movable opaque curtain and oriented to receive light (preferably ambient illumination) transmitted through the front surface of the device towards the illuminating surface. The photosensors respond to the light intensity modulation produced by the transparency or by the image within and produce signals $T_X(Y)$ or $T_Y(X)$ or $T(X,Y)$ corresponding to T, the attenuations of light caused by the transparency, or the image within the transparency, relative to the location (X,Y) of said attenuations. Subsequently, the above signals are used to determine and control the positioning of the masking arrangement.

In an alternative embodiment of the present invention, at least one differential photosensor or at least one photosensor pair is oriented to produce differential or separate signals corresponding to the intensity of light transmitted through the transparency as well as the intensity of light transmitted through a portion of the front surface image plane not occupied by the transparency.

In a further, preferred, embodiment of the present invention, at least one of the masking elements is positioned between the surface containing the transparency and the observer. In such arrangement at least one photosensor is located at the edge of the masking-element and oriented to receive the light projected from the illumination source towards the front surface.

Alternatively, delineation of the area occupied by the transparency and recognition of the image-carrying portion of the transparency are achieved with little or no exposure of the observer to the illumination source other than through the transparency or the image-carrying portion thereof. This attribute can best be described as "normal masking".

In a preferred embodiment of the present invention, at least one photosensor is located at the edge of a movable opaque curtain and oriented to receive light from the illumination source transmitted towards the front surface. The photosensors respond to local light intensity produced by the illumination source and produce signals $T_X(Y)$, $T_Y(X)$ or L(X,Y), corresponding to the local light intensity variations of the illumination source. Subsequently, the intensity signals may be employed to determine and adjust the intensity and uniformity of the illumination source or to produce a system-failure alarm/indication.

In accordance with the a preferred embodiment of the present invention, the device, as described above, can be used in whole or in part in conjunction with a spatial light modulator. In such usages, the disclosed movable photosensors facilitate means for mapping the light transmission attenuation of the transparency, or parts thereof. The mapping means are preferably not interposed between the light source and the illuminated portion of the displayed transparencies. Rather, the mapping means may be interposed between the front surface and the illumination source. The signals produced by the photosensors may be used for selective gray level shading such as "unsharp masking."

More particularly, using even a single masking opaque curtain, e.g. "bottom masking", simplifies the use of LCDs as spatial light modulators, with the currently available size of about 14"×14". In such a system the LCD modulators would perform the masking over one portion of the front surface, e.g., "top". Furthermore, such an arrangement enables the use of one dimensional, e.g. longitudinal, strips of the LCD, as opposed to a two dimensional matrix, thus enabling direct-drive methods which, inherently, produce the highest contrast achievable from LCDs.

In yet another embodiment of the present invention, one dimensional "width masking" is achieved by spatial control of the back-lighting. "Width masking" can be achieved, for example, by selectively energizing an array of longitudinal lamps such as fluorescent bulbs or, more specifically, "aperture lamps" which are available from "LCD Lighting Inc.".

In accordance with the present invention, the apparatus may be used as a stand-alone self-masking device, as an add-on superimposed on a non-masking transparency (e.g. film) viewer, or in combination with the viewboxes described in patent applications U.S. Ser. No. 07/861,982, U.S. Ser. No. 07/862,982, U.S. Ser. No. 08/175,372, U.S. Ser. No. 08/348,958; PCT/EP94/03968 or PCT Publications WO 91/10152 or WO 93/01564, the disclosures of all of which are incorporated herein by reference. For example the apparatus may include an externally mounted imaging camera for image delineation, or may be incorporated into a magazine-fed automatic film viewer, i.e. an "alternator", in which case the available film pick & place mechanism of the alternator may be utilized to perform some of the identification tasks. An additional external source of visible or other radiation may be utilized to enhance the sensitivity of the photosensors to differences in the transmission of the image-carrying transparency.

In accordance with a preferred embodiment of the invention, the normally used fluorescent lamps may be replaced by one or a very few high intensity discharge lamps, i.e. metal halide light sources. Preferably, light from such a lamp is reflected off the sides and back of the housing before being illuminating the transparency.

There is therefore further provided, in accordance with a preferred embodiment of the invention, a transparency viewing device comprising:

a light transmitting viewing surface which accommodates a transparency to be viewed;

a light source which provides backlight illumination to the viewing surface, thereby creating a viewing field having a transparency-bearing region, the light source comprising a high intensity discharge lamp;

at least one diffuser situated between the high intensity discharge lamp and the viewing surface.

Preferably the device includes a housing in which the lamp is situated, one face of the housing being formed of the viewing surface. Preferably at least a portion of the interior surface of the housing comprises a reflective surface, which can be either specularly reflective or diffusely reflective.

In a preferred embodiment of the invention the device includes at least one reflector which blocks direct light from the lamp toward the viewing surface. Preferably the light reflected by the at least one reflector is directed to the reflective surface to provide indirect illumination of the viewing surface.

There is further provided in accordance with a preferred embodiment of the invention a transparency viewer including:

a light transmitting viewing surface which accommodates a transparency to be viewed;

a light source which provides backlight illumination to the viewing surface, thereby creating a viewing field having a transparency-bearing region;

an LCA array, comprising of a plurality of individually addressable strips aligned in a first direction, disposed between the light source and the viewing surface; and a masking element which masks an area of the viewing field and is movable in the first direction.

Preferably, the viewer has an extent in a second direction, perpendicular to the first direction, which is as wide as the viewing field.

Additionally or alternatively, the LCA strips are aligned in a vertical direction. Preferably, the viewing field has an upper portion and a lower portion and the masking element masks a portion of the viewing field including at least the entire lower portion.

BRIEF DESCRIPTION OF THE DRAWINGS

The present invention will be better understood from the following detailed description of preferred embodiments of the invention, taken in conjunction with the following drawings in which:

FIG. 1H is a schematic, cross-sectional illustration of a self-masking display device using reflectors in accordance with a preferred embodiment of the present invention;

FIG. 1I is a schematic, cross-sectional illustration of a self-masking display device using an alternate reflector arrangement in accordance with a preferred embodiment of the present invention;

FIG. 2A is a schematic, perspective, illustration of a movable opaque curtain in combination with an LCD spatial modulator used in some preferred embodiments of the display device of the present invention;

FIG. 2B is a signal diagram of driving signals useful for the embodiment of FIG. 2A;

FIG. 2C is a schematic, perspective, illustration of an addressable diffuser used as masking means in some preferred embodiments of the display device of the present invention;

FIG. 3 is a schematic, cross-sectional, illustration showing a movable opaque curtain in combination with selectively energized lamps used in further preferred embodiments of the display device of the present invention;

FIG. 4 is a schematic, cross-sectional, illustration showing a further preferred embodiment of the present invention in which masking elements are located between a light fixture and a front panel of the display device;

FIGS. 8A, 8B and 8C are schematic illustrations of various masking elements optionally used by the self-masking display device according to preferred embodiments of the present invention;

FIG. 9A is a front view, schematic, illustration of a display device using an ambient reference, in accordance with another preferred embodiment of the present invention;

FIG. 9B is a top view, schematic, illustration of the display device of FIG. 9A and the circuitry used therein;

DETAILED DESCRIPTION OF THE PREFERRED EMBODIMENTS

Figure 1A:
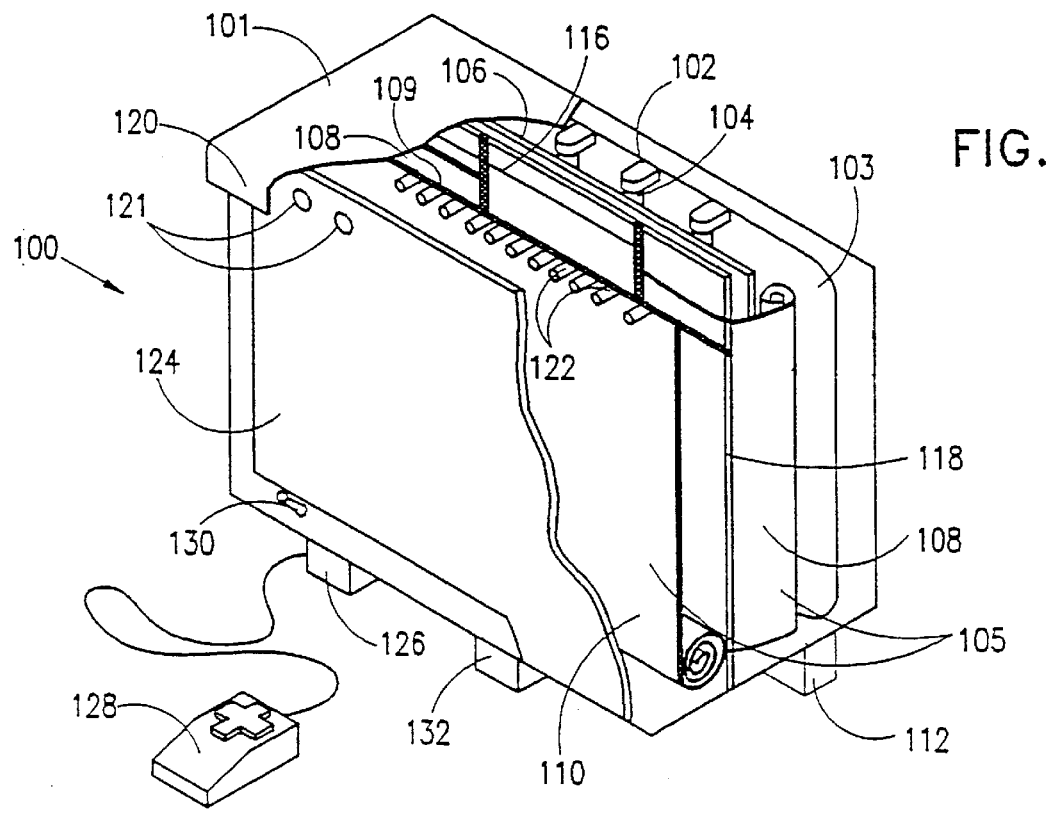
FIG. 1A is a schematic, partly cut-away, perspective illustration of a self-masking display device with movable opaque curtains in accordance with a preferred embodiment of the present invention.

FIG. 1A schematically illustrates the basic functional arrangement of a self-masking display device 100 including movable opaque curtains 108 and/or 110 in accordance with a preferred embodiment of the invention. Self-masking display device 100 comprises an opaque housing 101 which covers five sides of the display device and a light transmitting face plate 124 covering the sixth side. Transparencies, e.g. films, 20, as illustrated in FIG. 1E, are held on faceplate 124, for example, by slipping the transparencies under an edge 120 of housing 101. Alternatively, clips or other film holders may be provided to hold the film on the face plate as is well known in the art.

A bank of illuminators 104 is located behind face plate 124. An optional diffuser 106 is located between the illuminators 104 and the face plate 124 such that light reaching transparencies 20 is substantially uniform. The interior of housing 101 or at least the back interior surface 102 of housing 101 is preferably painted so as to diffuse and reflect rear and side illumination from illuminators 104. Optionally, an optical reflector 103, known in the art as a luminaire, is placed behind and partially around illuminators 104.

A masking arrangement 105, comprising two horizontal moving opaque curtains 108 and a vertical moving opaque curtain 110, is located interior to face plate 124. The moving opaque curtains 108 advance or retract along linear tracks 118 by means of pulling wires 116, pulleys (not indicated) and motors 112 as known in the art.

In some preferred embodiments of the present invention, other mechanisms known in the art may be used for guiding the motion of curtains 108 behind face plate 124, for example mechanisms including elements such as gears, bearings, springs or a movable endless belt curtain having alternating transparent and opaque portions.

In some preferred embodiments of the invention, electrical, pneumatic or hydraulic motors or other motorized mechanisms known in the art may be used for moving curtains 108, as well as any combinations of such mechanisms.

At least one photosensor 122 is located on at least one of the edges 109 of moving opaque curtains 108 or 110. photosensor 122 is positioned so as to receive light passing through the faceplate 124 and/or transparency 20. A photosensor signal generated by photosensor 122 is transmitted to a control system 126 (FIGS. 1D and 1G) which, in response thereto, produces a control signal which controls the position of the movable opaque curtains 108 or 110.

In some embodiments of the invention, optional stationary sensors 121 are located under edge 120 of housing 101. Stationary sensors 121 detect the insertion of a transparency 20 into self-masking display device 100. The stationary sensors 121 may be used for measuring one linear dimension of transparency 20, such as width, and may generate a corresponding signal to the control system 126. As known in the art, sensors 121 may include mechanical levers, electrical switches, photosensors or proximity sensors responsive to physical changes such as changes in capacitance, inductance or pressure.

In some embodiments of the invention, additional manual override means 128 is optionally provided for controlling the position of curtains 108 and/or 110 and, preferably, to control the illumination intensity. Any manual control means known in the art may be used, for example a Joystick, a mouse, electrical switches, a toggle switch, photosensors, an electronic touch screen, a voice recognition system, a head mounted control transmitter, a light pen or a computer keyboard or any combination of the above.

An on/off switch 130 for initiating and terminating the operation of self-masking display device 100 is preferably located on the front side of housing 101. A power supply unit (not shown) for powering self-masking display device 100 is preferably mounted inside housing 101 of the display device.

Figure 1B:
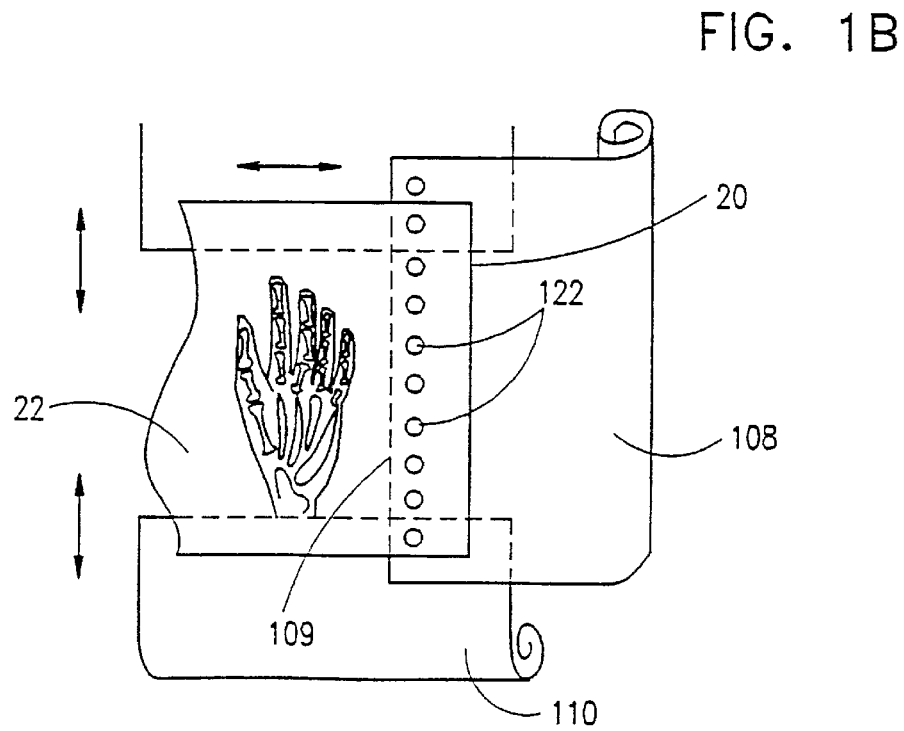
FIG. 1B is a schematic front view illustration showing width-detection means and film attenuation mapping used by the self-masking display device according to a preferred embodiment of the present invention.

FIG. 1B shows schematically the use of width detection means according to another preferred embodiment of the present invention. FIG. 1B also illustrates a preferred technique of transparency attenuation mapping. A linear array of photosensors 122 is mounted on the edge 109 of movable curtain 108 with photosensors 122 directed to receive light, preferably ambient illumination, which is transmitted through transparency 20 or faceplate 124. The photosensors 122 respond to changes in light intensity, particularly changes caused when curtain 108 reaches an edge of transparency 20 or an edge of an image-carrying portion 22 within the boundaries of transparency 20. In response to such intensity changes, sensors 122 produce signals $T_X(Y)$, $T_Y(X)$ or $T(X,Y)$ which correspond to the attenuation of light intensity, T, at different locations, (X,Y), on faceplate 124. The "attenuation map" defined by the signals of sensors 122 can be used to identify regions covered by transparency 20 or image portion 22 thereof.

In a preferred embodiment of the invention, the signals from sensors 122 are used by control system 126 to determine and control the positioning of the masking arrangement, e.g. to control the positioning of moving opaque curtains 108 and/or 110. FIG. 1B illustrates one preferred embodiment of the invention in which masking by curtains 108 and 110 reaches the boundaries of image-carrying portion 22 such that non image-carrying portions of transparency 20 are masked.

Figure 1C:
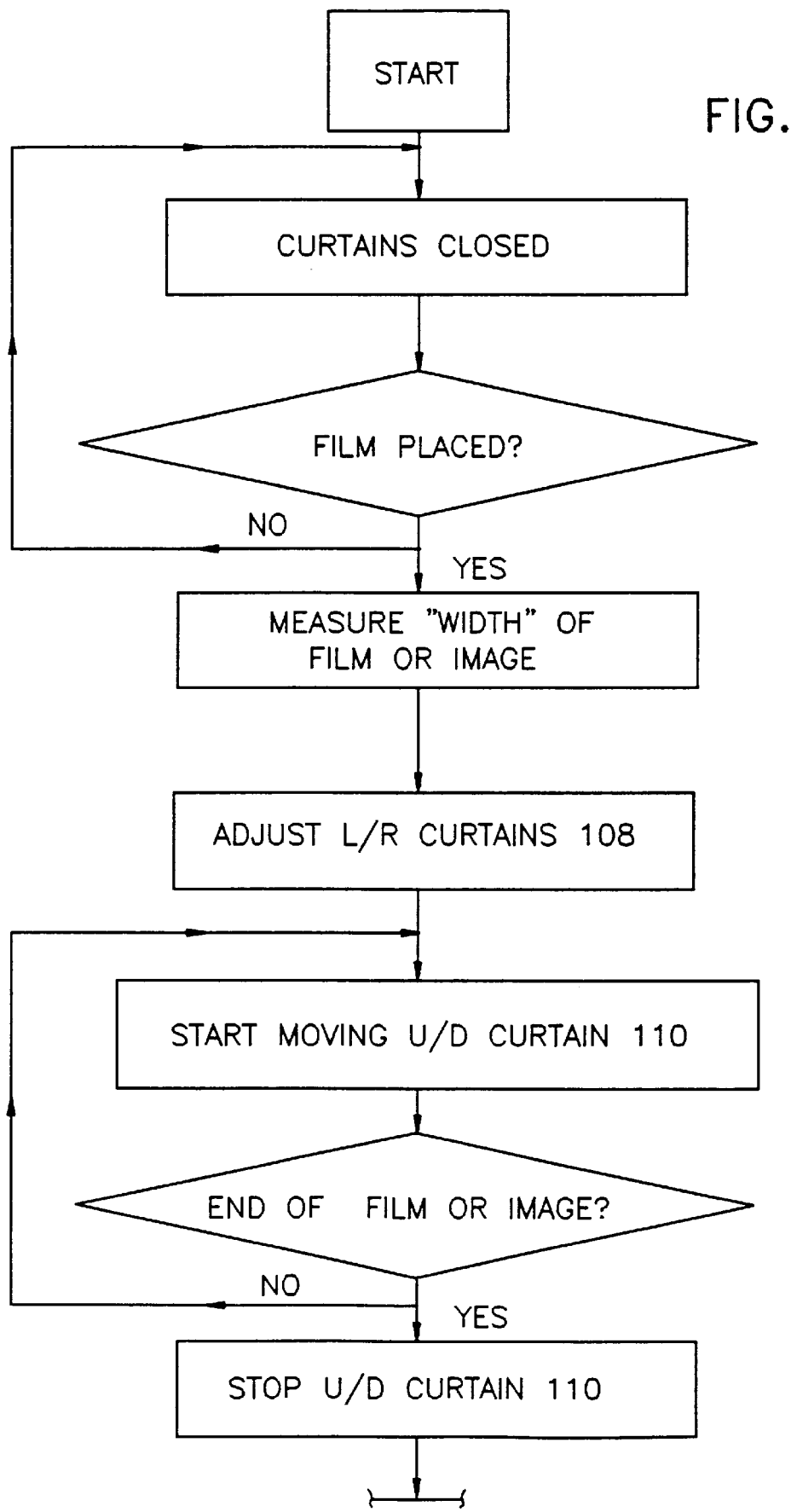
FIG. 1C is a schematic flow chart showing a preferred mode of operation of the device of FIG. 1A in accordance with a "normally masked" sequence.

FIG. 1C is a flow chart illustrating a preferred mode of operation of the self-masking display device of the present invention in accordance with a "Normally Masked" sequence in which, initially, before curtain 108 or 110 moves to the correct masking position, faceplate 124 is completely masked. The methodology of FIG. 1C can be implemented using appropriate hardware or software in control system 126, which controls the positioning of opaque curtains 108 and/or 110 according to the flow chart. It will be appreciated that the method of FIG. 1C enables efficient masking of the illuminated area outside transparency 20 or the illuminated area outside image-carrying portion 22, depending on the specific embodiment, whereby the observer is not blinded by direct illumination from the radiation source prior to or during the determination of the correct masking position.

Preferably, the process starts when a transparency is sensed as being placed on the faceplate and the curtains close automatically when its removal is sensed.

Figure 1D:
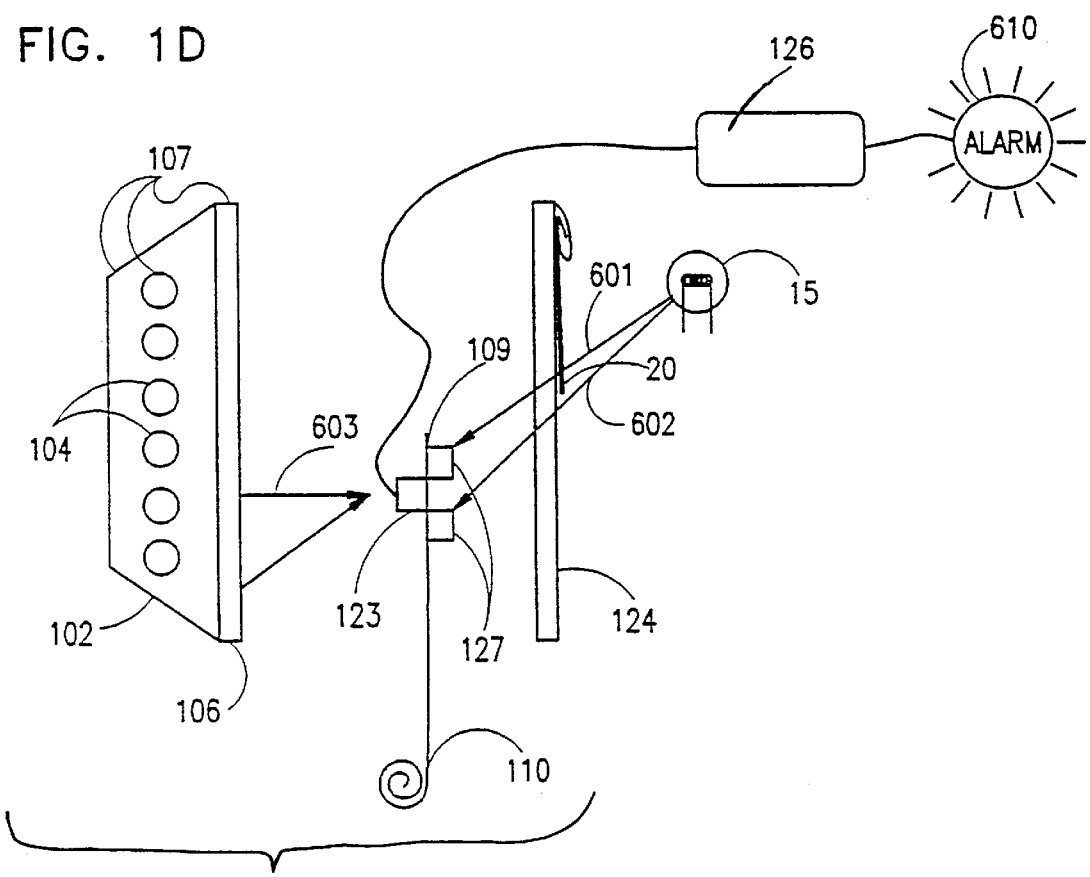
FIG. 1D is a schematic, cross-sectional, illustration of a self-masking display device using curtain mounted photosensors in accordance with a preferred embodiment of the present invention.
Figure 1E:
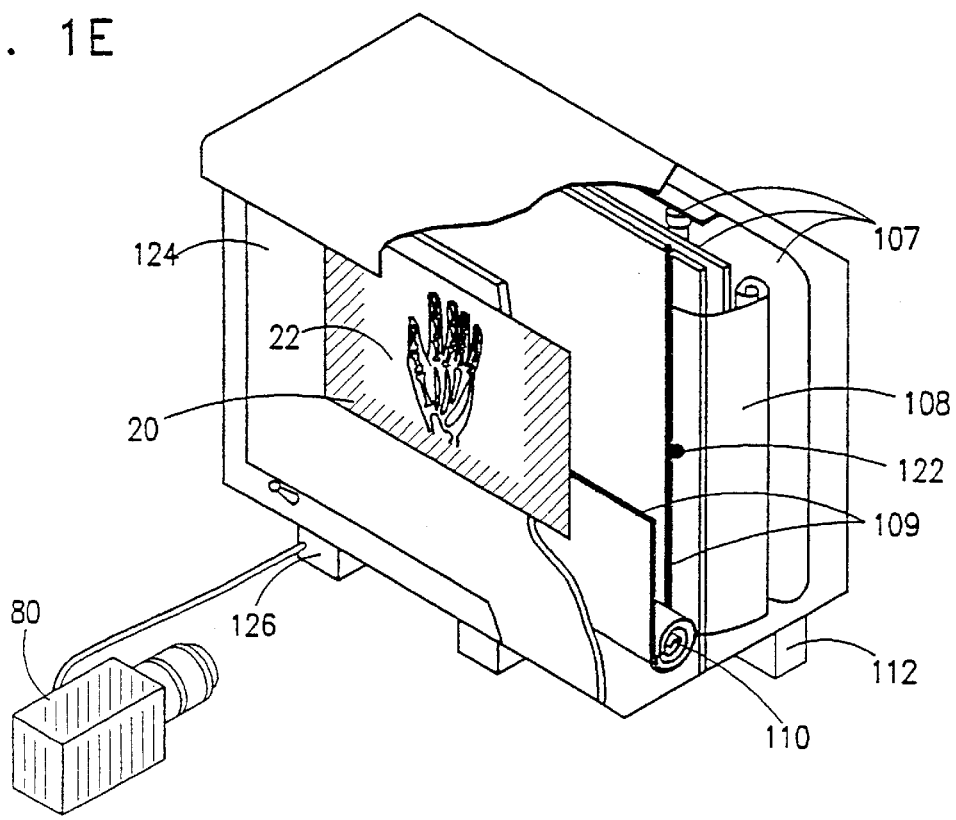
FIG. 1E is a partial, schematic, partly cut-away, perspective, illustration of a preferred embodiment of the invention in which the illumination field is in conformity with an image-carrying portion of a transparency.

FIG. 1D shows schematically an alternative, preferred, arrangement in which at least one differential photosensor or photosensor pair 127 is located on edge 109 of moving curtain 110 or 108 and is oriented to receive and respond to light from an external source 15, such as light rays 601 and 602, transmitted through faceplate 124. As shown in FIG. 1D, edge 109 of curtain 110 can be detected by detecting a difference between the light intensity of ray 601, which is attenuated by the bottom of portion of transparency 20, and ray 602 which is received through an unoccupied portion of faceplate 124.

In a preferred embodiment of the invention, external light source 115 may have a coded intensity modulation to match a decoder circuit in photosensor pair 127. Alternatively, external source 115 may emit radiation at a spectral wavelength, preferably different from the room lighting, to which photosensor pair 127 is sensitive.

In some embodiments of the present invention, at least one additional photosensor 123 is located at the back side of edge 109 of curtain 110 or 108 and is oriented to receive and respond to radiation 603 from a backlight arrangement 107. Backlight arrangement 107 includes illumination sources 104, which may be fluorescent light strips, and an optional diffuser plate 106 which diffuses the light to produce substantially homogeneous illumination on faceplate 124. Photosensors 123 produce signals $L_x(Y)$, $L_y(X)$ or $L(X,Y)$, corresponding to the intensity of backlighting, L, at locations (X,Y). This enables mapping of spatial variations in the intensity of illumination from backlight arrangement 107. Signals $L(X,Y)$ may be subsequently used by system controller 126 to determine and adjust the intensity and uniformity of the backlighting from backlight arrangement 107 and/or to activate a system-failure alarm/indicator 610.

FIG. 1E schematically illustrates the self-masking display device of the present invention operating in a preferred mode of operation in which the illuminated field, i.e. the unmasked area, includes only image-carrying portion 22 of transparency 20. The positions of opaque curtains 110 and 108 are controlled by control system 126, preferably using motors 112 which move the curtains to a position which yields desired masking, for example masking of portions of faceplate 124 not occupied by transparency 20. In a preferred embodiment, as shown in FIG. 1E, only image-carrying portions, such as portion 22 of transparency 20 remain unmasked. Whether the edge of transparency 20 or the edge of image-carrying portion 22 is detected as the boundary of the masking area depends on the sensitivity of sensor 122 and/or of control system 126 to changes in light intensity.

In a further preferred embodiment of the invention, as shown in FIG. 1E, mapping of the viewing area is performed using a CCD camera 80 instead of sensors 122 as shown in FIGS. 1A and 1B. CCD 80 generates an electronic image corresponding to the optical image of the viewing area and the position of the masking elements is controlled by controller 126 based on the electronic image, for example by detecting the locations of abrupt changes in the "density" of the electronic image as known in the art.

Figure 1F:
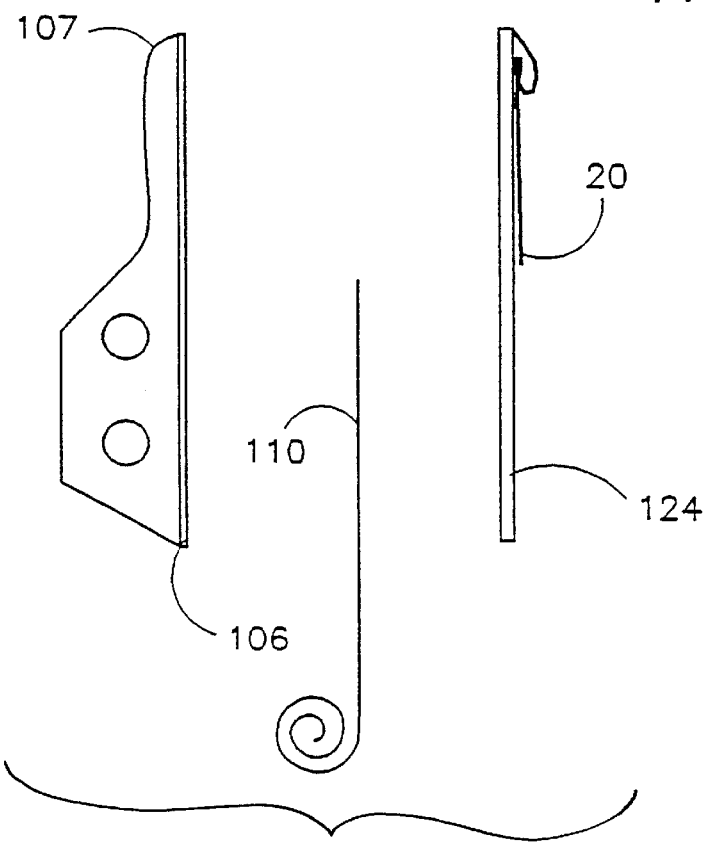
FIG. 1F is a schematic, cross-sectional, illustration showing the location of a moving opaque curtain between a faceplate and a faceplate diffuser of a display device similar to that of FIG. 1A.
Figure 1G:
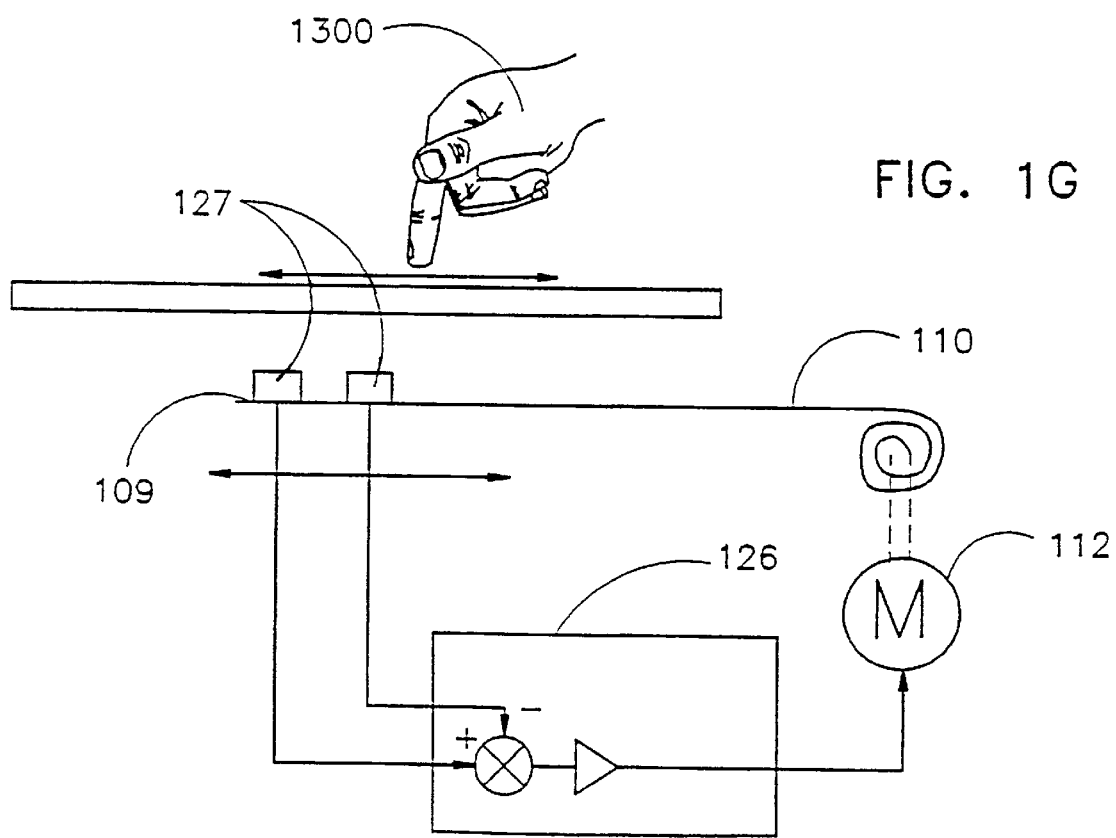
FIG. 1G is a schematic, cross-sectional, illustration of a finger pointing method for manual intervention in the operation of a self-masking display device as in FIG. 1A.

FIG. 1F is a simplified, cross-sectional, schematic, side view, illustration of an opaque curtain, such as curtains 108 and 110, located between faceplate 124 and diffuser 106 of backlighting arrangement 107 as in FIG. 1D. FIG. 1G is a schematic, cross-sectional, illustration of a variation of the preferred embodiments described above, incorporating a finger-pointing method of manual intervention. At least one differential photosensor or photosensor pair 127, preferably located on the front surface of edge 109 of curtain 110 or 108, is adapted to detect illumination changes caused by external intervention, such as by the hand 1300 of a user, and to transmit appropriate control signals to system controller 126 when such intervention is detected.

As known in the art, the above described mechanism can be utilized to provide tracking motion whereby the edge 109 of movable curtain 108 or 110 follows the motion of hand 1300 over faceplate 124. Such tracking can be achieved, for example, through closed loop control by system controller 126 and motor 112, as long as there is a substantial difference between the two signals produced by the differential photosensor or photosensor pair 127. When hand 1300 is removed from faceplate 124, the two signals of sensor 127 are substantially the same and, thus, motion of opaque curtains 108 or 110 is halted. Alternatively, hand 1300 can be replaced by other pointing means, as known in the art, such as a light-pen, a laser-pointer or the like. Additionally, other detection methods can be used, for example the photosensors can be replaced by detectors of ultrasound, RF or other waves generated by appropriate sources, or by proximity pick-up devices which detect changes in capacitance, inductance, pressure or the like, as known, in the art.

FIG. 1H is a schematic, cross-sectional, illustration of a variation of the preferred embodiments described above, incorporating reflectors for amplifying the intensity of the light which is projected through unmasked areas of a transparency.

The reflectors preferably include a reflective backing 150 and reflective coatings on several or all inner surfaces of housing 101.

Reflective backing 150 typically comprises a mirror finish or a diffusing reflective coating and is preferably positioned on a back surface of opaque curtains 108 and/or 110 (shown in FIG. 1A), i.e. the surface of opaque curtains 108 and/or 110 which are facing illuminators 104. Opaque curtain 110, which is not shown in FIG. 1H for the sake of simplicity, moves in a direction perpendicular to the direction of motion of opaque curtains 108.

Preferably, interior surfaces of housing 101 or at least the back interior surface 102 of housing 101 are coated with a mirror finish or a diffusing reflective coating. Alternately, reflectors may be provided along interior surfaces of housing 101.

It is appreciated that the use of mirror finish in coating interior surfaces of housing 101 and/or in reflective backing 150 provides a high level of light reflection, but may cause lower uniformity of the projected light. By comparison, the use of a diffusing coating provides a lesser level of light reflection but maintains the uniformity of the light projected. Diffuser 106 will at least partially compensate and correct non-uniformities that are caused by use of mirror finishes.

In the absence of reflective backing 150, light from illuminators 104 is typically absorbed by opaque curtains 108 and/or 110. The addition of reflective coating 150 causes light to be re-utilized by reflection from reflective backing 150 to specular reflective or diffusive reflecting interior surfaces of housing 101. The reflected light is then projected through unmasked areas of transparency 20, thus intensifying the light projected through unmasked area of transparency 20. Some of the light may be reflected several times prior to passing through the unmasked portion of the front surface.

This intensification provides added illumination of the unmasked area of transparency 20, thus enhancing visual perception thereof.

The precise intensity of the light from illuminators 104 through unmasked areas of transparency 20 varies and is an inverse function of the size of the unmasked portion of transparency 20. It is appreciated that when curtains 108 and/or 110 are fully opened, reflective backing 150 does not affect the illumination field projected through transparency 20. As the size of unmasked area of transparency 20 is decreased, more light is re-utilized as described above and the intensity of uniform light projected through the unmasked area of transparency 20 automatically increases.

Intensifying the projection of light through the unmasked areas of transparency 20 is particularly useful when dealing with many types of X-ray transparencies. In many instances, the region of an X-ray which is most interesting to an observer is quite dense, making assessment of information therefrom difficult. Additional illumination of a region of interest may increase visual perception thereof and facilitate evaluation of these regions.

In some embodiments of the present invention, illuminators 104 are preferably staggered. That is, one group of illuminators is closer to diffuser 106 (and the transparency being viewed) than a second group. This has been found to result in a more uniform illumination. It has been found that with fluorescent lamps of any suitable color, when a center to center distance of 8 cm is used between lamps of a given group, that an offset of 2 cm between the planes of the lamp groups gives a markedly improved uniformity over that achieved when all the lamps are in the same plane. Preferably the distance between diffuser 106 and the back inner surface 102 of housing 101 should be large, with a 12 cm distance having found to be suitable. It should be understood that the overall uniformity is dependent on the distance between the diffuser and the back reflector, the spacing of the lamps and the offset between planes of lamps and that the optimum values of these distances are interdependent.

It should be appreciated that the use of staggered illuminators such as staggered illuminators 104 is not limited to the embodiment of FIGS. 1H and may be applied to any of the preferred embodiments described herein.

FIG. 1I is a schematic, cross-sectional, illustration of a variation of the preferred embodiment described above, incorporating an alternate reflector arrangement for intensifying the light which is projected through unmasked areas of a transparency.

In this embodiment of the present invention, reflectors preferably comprise moving angled reflecting curtains 152 which are placed between opaque curtains 108 and/or 110 and illuminators 104. Interior surfaces of housing 101 are reflectively or diffusively coated as described hereinabove with particular reference to FIG. 1H.

Moving angled reflecting curtains 152 may comprise a mirror finish or any other suitable reflecting material as described with respect to FIG. 1H. Alternatively, moving angled reflecting curtains 152 may comprise a reflective diffusing material.

Motion of angled reflecting curtains 152 may be guided by mechanisms such as those described hereinabove with reference to motion of opaque curtains 108 and/or 110.

Angled reflecting curtains 152 are preferably attached to or near the leading edge of opaque curtains 108 so that they are automatically extended or retracted with opaque curtains 108. Thus, during masking, the leading edge 154 of moving angled reflecting curtains 152 does not surpass the leading edge of opaque curtains 108, and therefore does not interfere with light projected to transparency 20.

Moving angled reflecting curtains 152 may be more effective than reflective backing 150 on opaque curtains 108 and/or 110 since said curtains direct light downwards, i.e. in the direction of non-masked regions of transparency 20. While it is appreciated that angled reflecting curtains 152 obviate the need for reflective backing 150 on opaque curtains 108, it is appreciated that a reflective backing 150 on opaque curtain 110 may still be desirable. Furthermore, curtain 108 may be omitted, if it is not needed for guiding curtain 152.

What has been described thus far with reference to FIGS. 1A–1I may be advantageously combined with the subsequent embodiments, as described below.

FIG. 2A is a schematic perspective view of part of a self-masking display device according to a further preferred embodiment of the present invention in which masking means are located between illumination sources 104 and faceplate 124. The masking means preferably include movable masking curtain 110 as described above and a liquid crystal array (LCA) spatial light modulator 200.

The LCA preferably includes a viewing device such as is known in the art and, particularly, as disclosed in patent applications U.S. Ser. No. 07/861,982, U.S. Ser. No. 07/862,982, U.S. Ser. No. 08/175,372, U.S. Ser. No. 08/348,958; PCT/EP94/03968 or PCT Publications WO 91/10152 or WO 93/01564, the disclosures of all of which are incorporated herein by reference. In a preferred embodiment of the invention, the LCA is addressed with a direct addressing scheme to drive vertical LC strips 202 using electrodes 204 and 206 and back plane electrode 208. For a "Normally Clear" mode LCA, the electrodes designated 206 receive an "off" signal, and the electrodes designated 204 receive an "On" signal. FIG. 2B shows an exemplary signal scheme 210.

Transparency 20, or a predetermined portion thereof, preferably an image-carrying portion thereof, is illuminated by backlighting as in the previous embodiments. However, in contrast to the previous embodiments, the illumination intensity on the remaining display area is substantially reduced by "On" elements 204 of LCA 200 and/or by curtain 110. FIG. 2 shows LCA 200 with vertical LC elements and curtain 110 which moves vertically. It should be appreciated, however, that a similar effect is achieved when LCA 200 is replaced with an LCA having horizontal LC elements and curtain 110 is replaced with curtains which move horizontally.

FIG. 2C is a schematic perspective view of part of a self-masking display device according to an alternate preferred embodiment of the present invention in which masking means comprise an addressable diffuser 250, for example, a liquid crystal spatial light diffuser. Such addressable diffuser arrays are available from Talige Inc. (CA) and Polyronix Inc. (TX).

Addressable diffuser 250 may generally be a matrix of liquid crystal elements and may be addressable in the manner described in U.S. patent application Ser. No. 08/348,958 and in PCT patent application PCT/EP94/03968, published as WO95/14949, the disclosures of which are incorporated herein by reference. Preferably, addressable diffuser 250 is addressable in both the horizontal and vertical directions, so that it can form a mask of diffusing material around a transmitting area 251 defining a transparency or a region of interest of the transparency typically located on a faceplate 124.

Alternatively, addressable diffuser 250 may be used in conjunction with opaque masks 108 and/or 110 (FIG. 1A or 2A).

Photosensor or mapping means as described hereinabove with particular reference to FIGS. 1B–1E or the patent applications referred to with respect to FIG. 2A are used to determine the boundaries of an image bearing region of a transparency 20. In accordance with said boundaries, signals are provided to addressable diffuser 250 to set the LC elements to a "Transparent" state in image bearing regions and to a "Diffusing" state outside of the image bearing boundaries of transparency 20.

LC elements in the "Transparent" state allow light from illuminators 104 to pass through, thereby illuminating image bearing regions of transparency 20. LC elements in the "diffusing" state diffuse light, thus providing a masking function as well as a light reflecting function, since up to 70% of the light is back reflected from the diffusing portions.

The illumination intensity of the masked areas of a transparency is substantially reduced by elements of addressable diffuser 250 which are in the light diffusing state so that opaque masking may not be necessary, while the illumination in the unmasked areas is enhanced due to the reflection and reuse of the light as described above, with respect to FIGS. 1H and 1I.

The normal "ON" state of each LC element may be either transparent or diffusing, depending on the specific addressable diffuser 250 which is used.

Addressable diffuser 250 is preferably located inside a housing 121 between a diffuser 106 and an inner back surface of housing 121. Housing 121 preferably has inner surfaces which are reflectively coated as described hereinabove with particular reference to FIGS. 1H–1I.

Importantly, a large portion, up to about 70%, of the light impinging on portions of addressable diffuser 250 which are in the diffusing state is reflected. Thus, the light impinging on these portions can be re-utilized resulting in an increase of the intensity of light in the transparent regions.

Face plate 124 may comprise an active face plate such as those described in the U.S. and PCT applications and publications of Inbar et. al as referenced above such that the lighting system comprises an addressable diffusing LC plate facing the source of illumination and a front surface masking LC array which further reduces the light passing through the masked portions of the front surface.

FIG. 3 schematically illustrates another preferred embodiment of the present invention in which movable masking curtain 110 is placed between an array of selectively energizable illumination sources 302 and faceplate 124. According to this embodiment, masking is achieved by the combined effect of masking curtain 110 and the selective energizing of elements of the array of light sources 302. Sources 302 are preferably fluorescent aperture lamps, as available from "LCD Lighting, Inc.", which are mounted vertically. A lightguide 304 is optionally placed between each of sources 302 and diffuser 106, which is also optional.

Transparency 20, or a portion thereof, is illuminated by backlighting as in the previous embodiments. The illumination intensity on the remaining display area is substantially reduced by curtain 110 or by selective deactivation of some of sources 302 which are preferably controlled by control system 126. It should be appreciated that sources 302 can be horizontal or vertical as long as motion of curtain 110 is substantially perpendicular to sources 302.

FIG. 4 schematic illustrates a further preferred embodiment of the present invention in which the at least one moving opaque curtain, 108 or 110, is placed between illumination sources 104 and a front panel 924 which may be transparent, translucent, fluorescent, phosphorescent, diffusing or any combination of the above. Reflector 102 is preferably used in order to re-utilize some of the rear and side illumination from sources 104 as described above. Additionally, in a preferred embodiment, curtains 108 and/or 110 are backpainted, i.e. painted on the surface facing backlight sources 104, with reflective paint.

Figure 5:
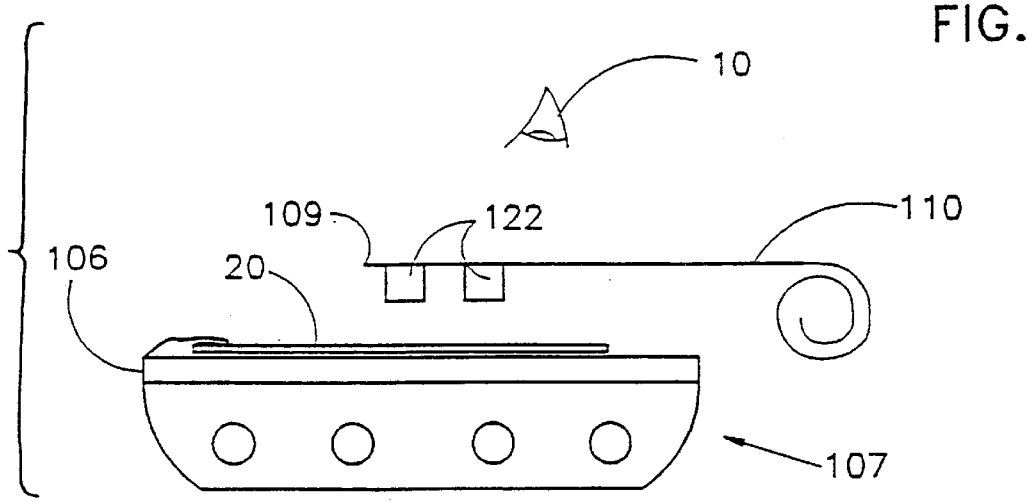
FIG. 5 is a schematic, cross-sectional, illustration showing an alternative preferred embodiment of the present invention in which masking elements and sensors are located between the transparency plane and the observer.

FIG. 5 schematically illustrates yet a further preferred embodiment of the present invention in which the at least one moving curtain, 108 or 110, having photosensors 122 mounted near the edge 109 thereof, is placed between transparency 20 and an observer 10. According to this arrangement, transparency 20 is placed directly on the face plate of backlight arrangement 107, which may include diffuser 106, thereby obviating the need for a separate faceplate such as faceplate 124 (FIG. 1A). In the arrangement of FIG. 5, at least one photosensor 122 is located at near the edge 109 of movable curtain 110 and is oriented to receive light from the direction of backlighting arrangement 107, either directly or through transparency 20 or the image-carrying portion thereof.

Photosensor(s) 122 respond to changes in light intensity, particularly changes caused when curtain 110 reaches an edge of transparency 20 or an edge of image-carrying portion 22. In response to such intensity changes, sensors 122 produce signals $T_x(Y)$, $T_y(X)$ or $T(X,Y)$ which correspond to the attenuation of light at different locations (X,Y) on the face of backlighting arrangement 107. Subsequently, the above signals are used by system controller 126, as described above, to determine and control the positioning of curtains 110 or 108 as described above.

Figure 6:
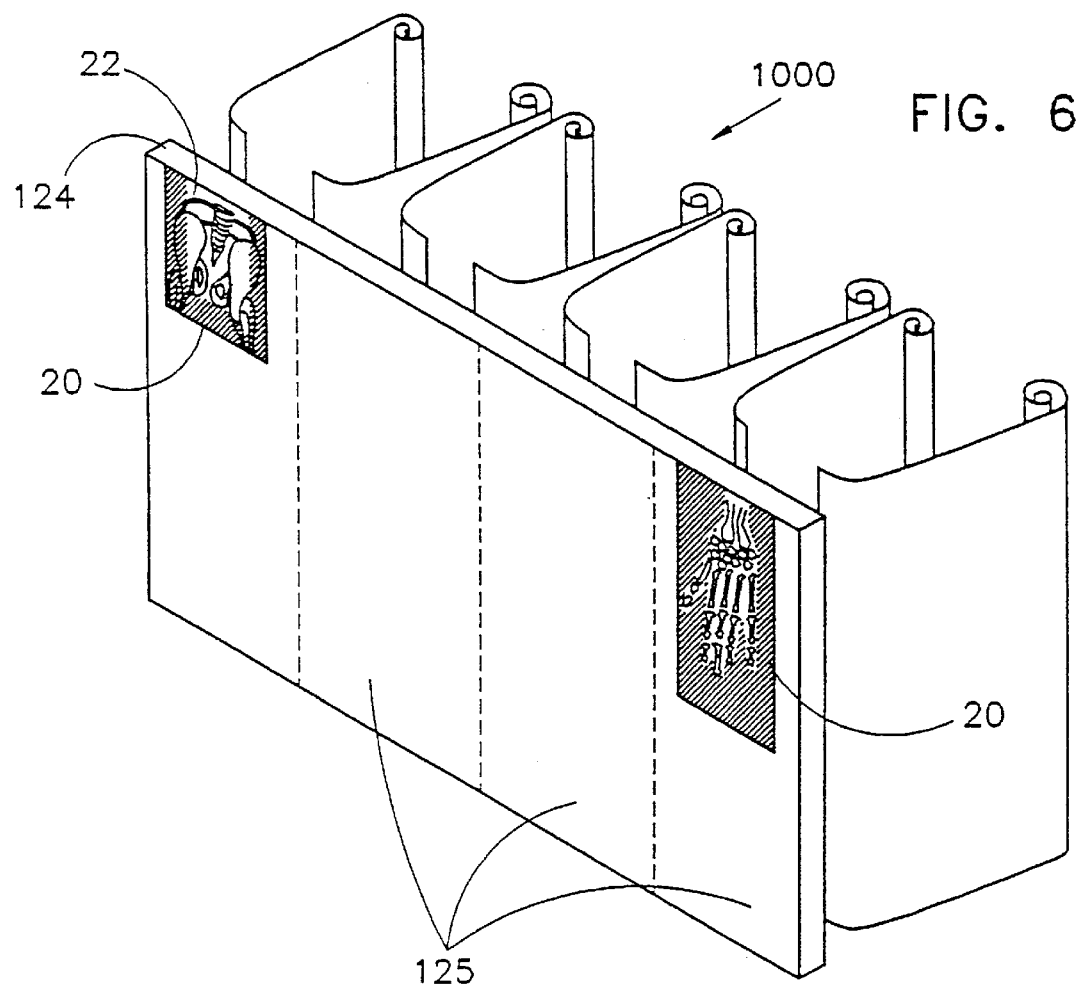
FIG. 6 is a schematic, perspective, illustration of another preferred embodiment of the present invention in which multiple maskable portions are located under an uninterrupted faceplate of the display device.

FIG. 6 is a schematic, perspective, illustration of a further preferred embodiment of the present invention in which a plurality of self-maskable backlighting units 125 are joined behind a common faceplate 124 to form a self-masking multi-transparency display 1000. According to this arrangement, at least two transparencies 20 can be presented simultaneously on self-masking display device 1000. Since this aspect of the present invention is particularly suitable for radiology film viewing, units 125 are preferably designed to accommodate standard size radiology films which are normally integer multiples of 14"×17", e.g. 14"×17", 28"×17", 56"×17" or 56"×34". Self-masking in each of units 125 may be in accordance with any of the embodiments described above.

Figure 7:
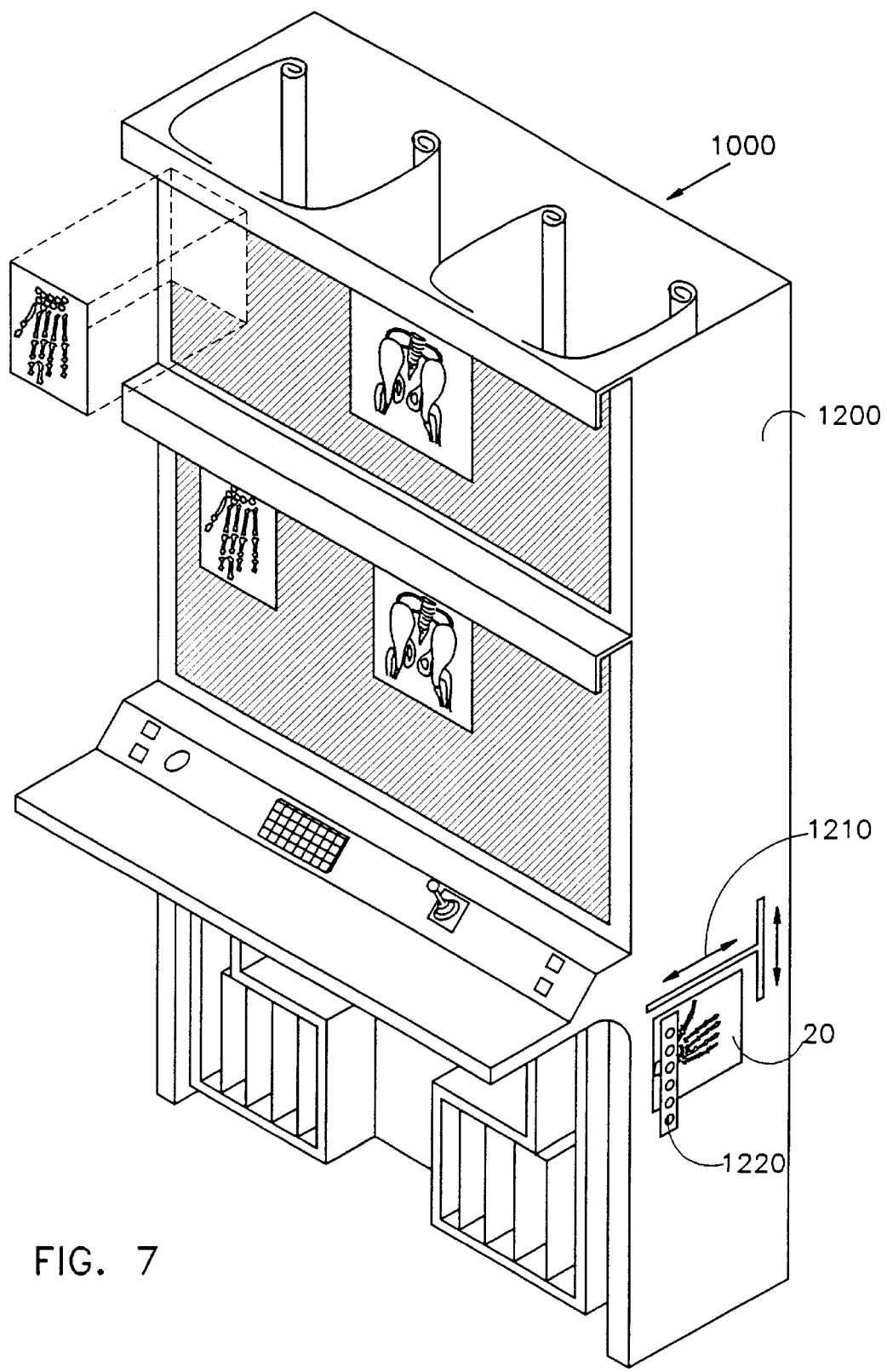
FIG. 7 is a schematic, perspective, illustration of a further preferred embodiment of the present invention in which the self-masking display device is incorporated into an alternator.

FIG. 7 schematically illustrates a further preferred embodiment of the present invention in which self-masking display device 1000 is incorporation in a magazine fed automatic film exchanger, hereinafter referred to as alternator 1200. Operation of the self-masking display device 1000 within alternator 1200 can be substantially as described above with reference to FIG. 6 and alternator 1200 can be operated as described in U.S. patent application Ser. No. 07/861,982, Ser. No. 07/862,982, in PCT application PCT/EP91/01310, published as WO93/01564 or in new U.S. patent application Ser. No. 08/348,959 and new PCT patent application to Inbar et al., published as WO95/14950, both of which are titled "Improved Display Device" and both filed on Nov. 28, 1994, all of which are incorporated herein by reference. However, in a preferred embodiment of the present invention, additional pick & place feeder mechanism 1210 of alternator 1200 is utilized to perform some of the identification tasks required for correctly masking units 125 (FIG. 6) of display device 1000. For example, if a horizontal moving linear feeder 1210 is used, a vertical line of photosensors 1220 can be placed juxtaposed with the moving film 20 and can be, thus, utilized for mapping film boundaries, image densities and the like. FIGS. 8A, 8B and 8C show schematically three examples of motorized masking-element arrangements, such as movable opaque curtain arrangements, which can be alternatively used in any of the embodiments of the present invention described above.

FIG. 8A describes one preferred arrangement in which a flexible curtain, 110 or 108, is rolled around the axis of a motor 112 and is pulled by wires 117. The wires are wrapped around pulleys 114 connected to an additional motor 112. The opaque curtains are pulled along retracted linear tracks 118 with optional friction reducing bearings 119 in response to synchronized clockwise or anti-clockwise revolutions of the motors 112. A rigid rod 115 is preferably attached to edge 109 of opaque curtain 108 or 110.

FIG. 8B describes an alternative linear motion mechanism comprising a motor 112, a leading screw 111, preferably a rolled ball screw, and a flanged-nut 113 which is connected to the rigid member 115 as in the embodiment of FIG. 8A. The revolutions of motor 112 are translated to linear motion of the flanged-nut 113 forwards or backwards, depending on the direction of motor revolutions, whereby edge 109 of opaque curtain 108 or 110 moves together with rigid rod 115.

FIG. 8C describes a mechanism similar to that of FIG. 8A but also including springs 114 which support curtain 108 or 110 in a stretched-out position while it is being moved back and forth by virtue of motor 112.

Reference is now made to FIGS. 9A and 9B which schematically illustrate a self-masking display device 900 constructed and operative in accordance with a further, preferred, embodiment of the present invention, in which an ambient light reference 960 is employed by a controller 926 in determining the correct positioning of a movable opaque curtain 910, such as curtain 108 or 110 (FIGS. 1–8), by a motorized mechanism including a motor 930 similar to motor 112 (FIG. 1G and 8A–8C). As seen particularly in FIG. 9A, display device 900 preferably includes an ambient light collector 950, which preferably comprises an elongated lightguide, located adjacent to and on the same plane with a faceplate 924 of device 900 and having a long dimension substantially parallel to the line of motion of curtain 910.

The long dimension of collector 950 is preferably aligned with faceplate 924, such that the percentage of the area covered by curtain 910 is substantially the same for collector 950 as for faceplate 924. Thus, when faceplate 924 is clear, i.e. no transparency is placed thereon, there is a predetermined, constant, ratio between the total amount of light received through collector 950 and that received through faceplate 924, for any positioning of curtain 910 and for any level of ambient light.

As seen in FIG. 9B, display device 900 preferably further includes elongate viewing sensors 922, which sense a predetermined portion of the ambient light received through faceplate 924 and generate a corresponding voltage, $V_s$, and a reference sensor 955 which senses the amount of ambient light collected through collector 950 and generates a corresponding reference voltage, $V_r$. Sensors 922 are preferably associated with elongated light guides 956, which are preferably substantially parallel to collector 950 and have substantially the same length as collector 950. Light guides 956 may extend in front of the light sources as shown in the figure, or if modulation coding or a specific spectrum is used for light source 960, the light guides may be behind the line of light sources.

The ratio between voltages $V_s$ and $V_r$, i.e. $V_s/V_r$, is preferably determined by a ratio-circuit 970 which generates a corresponding electric signal to controller 926. When faceplate is clear, i.e., when no transparency is present on the faceplate, the ratio $V_s/V_r$ is a constant. When a transparency is present on the viewing surface, as curtain 910 moves along the faceplate, the amount of light collected by sensors 922 varies differently from that of sensor 955 and the ratio is no longer constant. Simple analysis of the ratio (and its derivative) as a function of distance or time allows controller 926 to detect the edges of the image portion of the transparency or of the transparency itself and position the curtain accordingly.

It should be appreciated that the use of light guides such as light guides 956 is not limited to the embodiment of FIGS. 9A and 9B and may be applied to any of the preferred embodiments described above. In the preferred embodiments in which the sensors are described as being mounted on moving curtains, light guides may be mounted on the curtains and stationary sensors may be used for sensing the intensity of light collected by the light guides.

In this instance the lightguide can be a specular and or partially diffusing reflector used to redirect the backlighting from the moving curtain, preferably from the moving edge thereof, to stationary sensors.

Figure 10A:
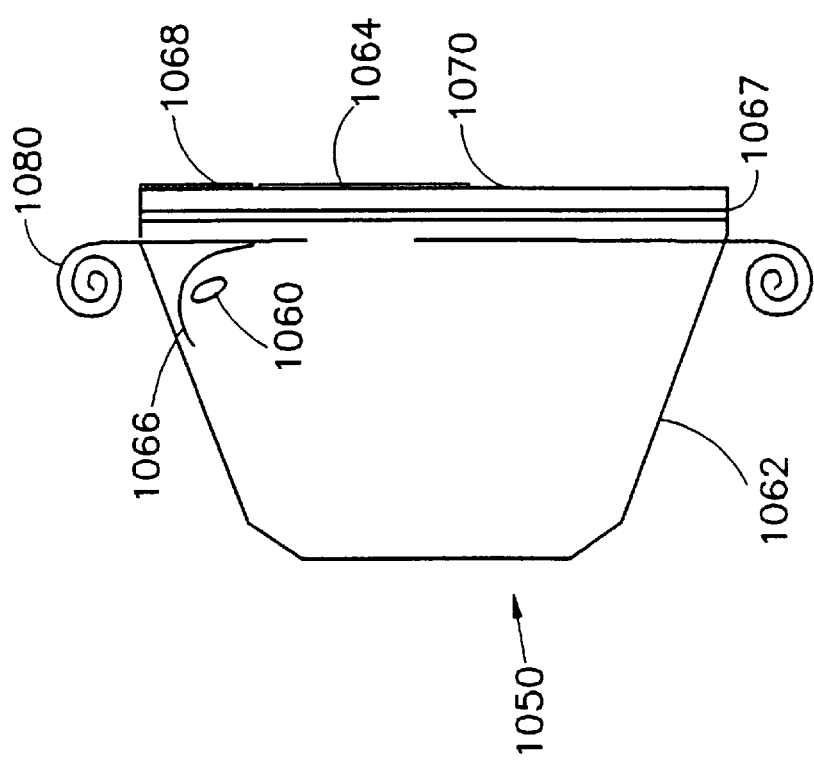
FIG. 10A is a schematic illustration of a self-masking display device using a high intensity discharge light source in accordance with another preferred embodiment of the present invention.

Reference is now made to FIG. 10A which schematically illustrates a self-masking display device 1002 constructed and operative in accordance with a further, preferred, embodiment of the present invention, in which the lighting arrangement for the illumination of transparencies preferably comprises a high intensity light source 1010 and an associated reflector 1015.

The basic functional arrangement of self-masking display device 1002 is generally as described in any of the embodiments described hereinabove or in any of the patents and patent applications incorporated herein by reference. However, in place of illuminators 104 (FIG. 1A), self-masking display device 1002 uses high-intensity light source 1010 to provide back illumination for transparencies 1020.

Light source 1010 preferably comprises a high intensity discharge light source, such as a metal halide or a xenon discharge lamp, such as are available from OSRAM, GMBH under part no. HQI-400W, HQI VG or under part no. HQI-400W-D NAU-VG.

Light source 1010 is preferably located between inner back surface 1032 of device housing 1030 and a face plate 1034. Reflector 1015 is positioned in close proximity to light source 1010. Preferably, reflector 1015 is concave and is coated on both sides with a reflective and/or diffusive coating. Reflector 1015 may have the shape shown in FIG. 10A, i.e., concave facing face plate 1034 and convex facing lamp 1010 or may be convex facing both face plate and lamp.

Preferably, inner surfaces of housing 1030 are coated with a diffusive or reflective coating as described hereinabove with particular reference to FIGS. 1H–1I.

Forward light from light source 1010 is directed towards reflector 1015 and then reflected to the inner surfaces of housing 1030. The reflected light and rear and side light from light source 1010 is either diffused or reflected, depending on the coating of inner surfaces of housing 1030, and is directed toward the face plate, thus providing back illumination for a transparency 1020 on the face plate.

A diffuser 1036 is preferably located between light source 1010 and faceplate 1034 such that light reaching transparency 1020 is substantially uniform.

Self-masking display device 1002 preferably comprises a masking arrangement 1040 to prevent light from light source 1010 from illuminating non-image bearing regions of a transparency 1020. Masking arrangement 1040 may be any of the masking arrangements described hereinabove with particular reference to FIGS. 1A–1I and FIG. 2C, or may be an LCA shutter arrangement such as described in any of U.S. or PCT patent applications and publications of Inbar et. al referenced above and incorporated herein by reference.

Moreover, self-masking display device 1002 preferably comprises a reflective arrangement operative to intensify light from light source 1010 through image bearing regions of transparency 1020 and which may be as described hereinabove with particular reference to FIGS. 1H–1I or FIG. 2C.

Additionally, self-masking display device 1002 optionally comprises a homogenizer 1035 as generally described hereinbelow with particular reference to FIGS. 11A–11B. It is understood that the specific configuration of the homogenizer 1035 including the placement thereof and pattern thereon will be determined in accordance with the specific reflective arrangements and diffuser of self-masking device 1002.

Figure 10B:
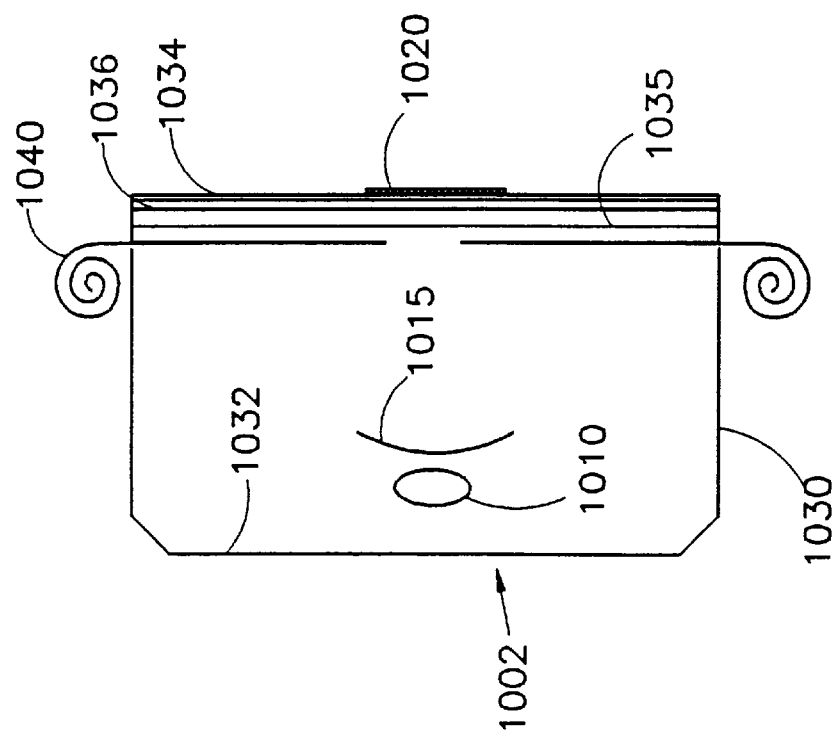
FIG. 10B is a schematic illustration of a self-masking display device using an alternately positioned high intensity discharge light source in accordance with another preferred embodiment of the present invention.

Reference is now made to FIG. 10B which schematically illustrate a self-masking display device 1050 constructed and operative in accordance with a further, preferred, embodiment of the present invention, in which an alternate lighting arrangement is used.

In this embodiment of the present invention, light source 1060 is preferably located in a forward upper or lower corner of a housing 1062. In accordance with the present embodiment, housing 1062 is preferably higher than a typical housing 121 (FIG. 1A). Increasing the height of housing 1062 allows placement of light source 1060 at a location where it does not interfere with placement and illumination of transparency 1064. Inner surfaces of housing 1062 are preferably coated with a reflective or diffusive coating as described hereinabove with particular reference to FIGS. 1H–1I.

A portion of the light from light source 1060 is directed towards a reflector 1066 and reflected therefrom to inner surfaces of housing 1062. Reflector 1066 is preferably curved and comprises at least one surface which is facing light source 1060 and which is coated with a reflective or diffusing coating. The rest of the light from source 1060 illuminates the inner, reflective surfaces of the housing directly.

Depending on the coating of inner surfaces of housing 1062, the reflected light along with direct illumination from light source 1060 is then either diffusely or specularly reflected toward the front surface, thus providing back illumination for transparency 1064.

A diffuser 1067 is preferably located between light source 1060 and faceplate 1070 such that light reaching transparency 1064 is substantially uniform. Furthermore, the front surface may include a LC shutter array as described above with respect to FIG. 10A.

Edge 1068 of housing 1062 prevents direct emission of light from light source 1060 through face plate 1070.

Self-masking display device 1050 preferably comprises a masking arrangement 1080 to prevent light from light source 1060 from illuminating non-image bearing regions of transparency 1064. Masking arrangement 1080 may be as described hereinabove with particular reference to FIGS. 1A–1I and FIG. 2C. Masking arrangement 1080 may comprise a reflective arrangement as described hereinabove.

Figure 11A:
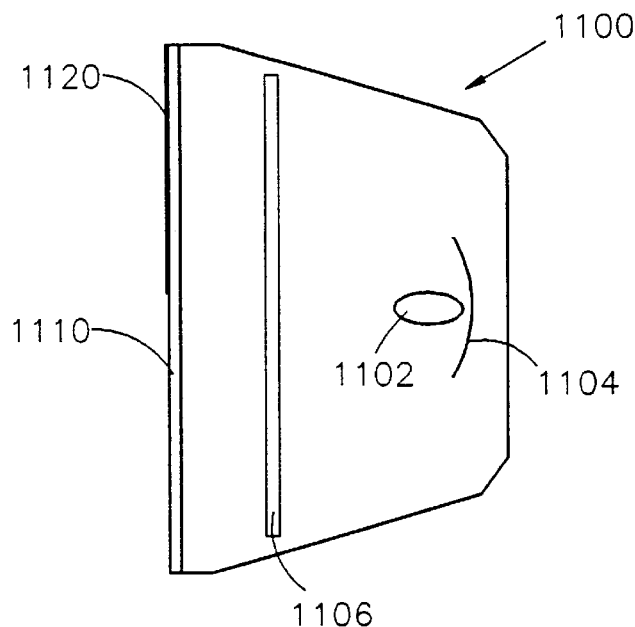
FIG. 11A, is a schematic illustration of a transparency viewing apparatus in accordance with another preferred embodiment of the present invention.
Figure 11B:
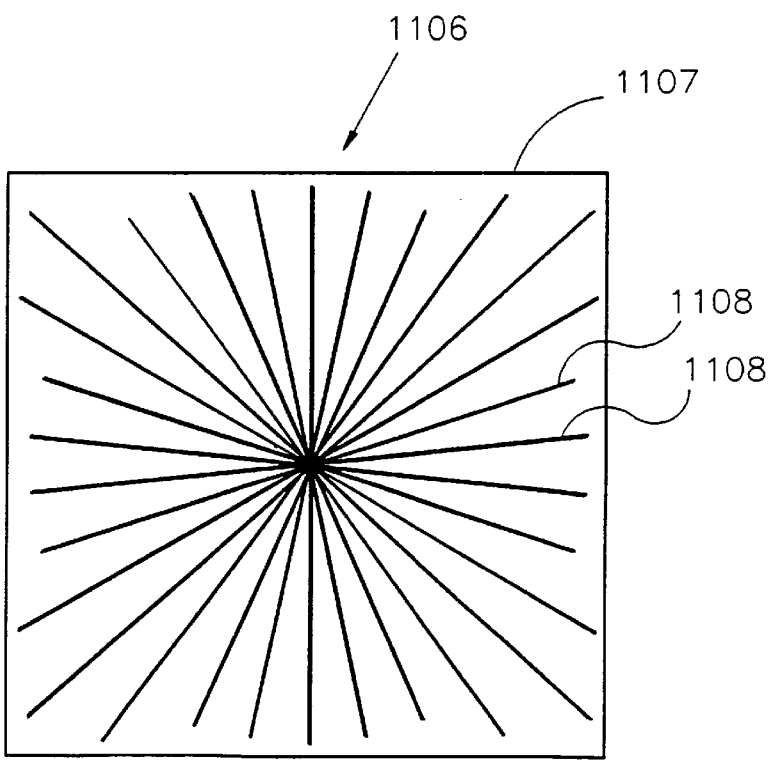
FIG. 11B is a front view, pictorial illustration of a light homogenizer of the transparency viewing apparatus of FIG. 11A in accordance with a preferred embodiment of the present invention.

Reference is now made to FIGS. 11A and 11B. FIG. 11A schematically illustrates a transparency viewing apparatus 1100 constructed and operative in accordance with a further, preferred embodiment of the present invention, in which the lighting arrangement for the generally uniform back illumination of transparencies preferably comprises a high intensity discharge light source 1102 such as those described with reference to FIGS. 10A and 10B, an associated reflector 1104, a light homogenizer 1106 and a light diffuser 1110.

FIG. 11B pictorially illustrates a front view of homogenizer 1106.

Transparency viewing apparatus 1100 may optionally comprise a masking arrangement to prevent light from light source 1102 from illuminating regions of transparency 1120. The masking arrangement may be as described herein.

Inner surfaces of the housing of transparent viewing apparatus 1100 are preferably reflectively or diffusively coated as described hereinabove.

Reflector 1104 is preferably curved and comprises at least one surface facing light source 1102 and which is coated with a reflective or diffusive coating. Reflector 1104 preferably is of the shape shown in FIG. 11A, i.e., convex facing light source 1102.

Rear and side illumination from light source 1102 is directed from reflector 1104 towards a light homogenizer 1106. Homogenizer 1106 preferably includes a plate 1107 comprised of a transparent material and having a plurality of specularly or diffusively reflective strips or other shapes 1108 thereon. Preferably, reflective strips 1108 form a pattern as generally illustrated in FIG. 11B, having strips radiating from a center region of plate 1107. This arrangement provides the center region of plate 1107 with a generally solid density of reflective material. The density of reflective material over regions of plate 1107, diminishes towards the edges thereof.

Light from light source 1102 and/or from reflector 1104 which most directly impinges on center region of plate 1107 is either specularly reflected or diffused by the generally solid area of reflective material located in a center region of plate 1107. The light is then re-reflected by the inner reflective surfaces of the housing of transparency viewing apparatus 1100.

Diffuser 1110 is positioned sufficiently far from homogenizer 1106 such that it can mix the reflected and re-reflected light, contributing to the overall uniformity of light illuminating transparency.

The effect of the lighting arrangement is to convert light from light source 1102 into distributed, homogenized light, useful for back illumination of transparency 1120. The overall uniformity provided by the light arrangement is primarily dependent on the distance between diffuser 1110 and homogenizer 1106 and on the pattern formed by the reflecting strips 1108.

It will be appreciated by persons skilled in the art that the present invention is not limited to what has been thus far described. Rather, the scope of the present invention is limited only by the following claims:

What is claimed is:

1. A transparency viewing device comprising:
   at least one interior reflective surface;
   a light transmitting viewing surface adapted to accommodate a transparency to be viewed;
   a light source which provides backlight illumination to the viewing surface, thereby creating a viewing field having a transparency-bearing region;
   at least one masking element mounted and configured for movement with respect to the viewing surface, which masks an adjustable area of the viewing field leaving a field of view, including at least part of the transparency bearing region, unmasked;
   a motor for moving the at least one masking element; and
   at least one reflective element, additional to the interior reflective surface, attached to the masking element such that when the masking element moves the at least one reflective element moves together with the masking element and the at least one reflective element directs at least part of the light from the masked area to the field of view in an amount such that the backlighting of the unmasked region is substantially changed as a function of the movement of the masking element.

2. A device according to claim 1, wherein the at least one reflective element comprises at least one movable reflective curtain which moves in a given direction.

3. A device according to claim 2 wherein the at least one movable reflective curtain is angled to direct light in a generally central direction.

4. A device according to claim 1 or claim 2 wherein the at least one reflective element comprises a reflective coating on a surface of the at least one movable masking element.

5. A device according to claim 4 wherein the reflective element has a specular reflection.

6. A device according to claim 4 wherein the reflective element has a light diffusing reflection.

7. A transparency viewing device comprising:
   at least one inner reflective surface;
   a light transmitting viewing surface adapted to accommodate a transparency to be viewed;
   a light source which provides backlight illumination to the viewing surface, thereby creating a viewing field having a transparency-bearing region;
   a masking element comprising an array of addressable liquid crystal elements having selectively light diffusing and light transmitting states situated intermediate the light source and the viewing surface; and
   a controller which controls the state of the array of elements such that elements of the array form a diffusely lit mask surrounding at least a portion of the transparency bearing region, the array being directly illuminated by the light source, such that light from the source is directed by the light diffusive mask toward the at least one inner reflective surface.

8. A device according to any of claims 1, 2, 3 or 7, wherein the area of the viewing field masked by the masking element is substantially all of the viewing field outside the transparency-bearing region.

9. A device according to any of claims 1, 2, 3 or 7, and further comprising a diffuser situated between the masking element and the viewing surface, which diffuses the light from the light source to provide more homogeneous backlight illumination.

10. A device according to any of claims 1, 2, 3 or 7, and further comprising a transparency holder for supporting the transparency on the viewing surface.

11. A device according to any of claims 1, 2, 3 or 7, wherein the at least one inner reflective surface comprises interior surfaces of a housing containing the light source and having the viewing surface forming one face thereof.

12. A device according to any of claims 1, 2, 3 or 7, wherein the at least one inner reflective surface has a specular reflection.

13. A device according to any of claims 1, 2, 3 or 7, wherein the at least one inner reflective surface has a diffuse reflection.

14. A transparency viewer comprising:
    a light transmitting viewing surface adapted to accommodate a transparency to be viewed;
    a light source which provides backlight illumination to the viewing surface, thereby creating a viewing field having a transparency-bearing region;
    a liquid crystal array (LCA), comprising of a plurality of individually addressable strips aligned in a first direction, disposed between the light source and the viewing surface; and
    a masking element which masks an area of the viewing field and is movable with respect to the liquid crystal array (LCA) in the first direction.

15. A viewer according to claim 14, wherein said masked area of the viewing field has an extent in a second direction, perpendicular to the first direction, which is as wide as the viewing field.

16. A viewer according to claim 14 or claim 15, wherein the strips are aligned in a vertical direction.

17. A viewer according to claim 16, wherein the viewing field has an upper portion and a lower portion and wherein the masking element masks a portion of the viewing field including at least the entire lower portion.

18. A transparency viewing device comprising:
    at least one interior reflective surface;
    a light transmitting viewing surface adapted to accommodate a transparency to be viewed;
    a light source which provides backlight illumination to the viewing surface, thereby creating a viewing field having a transparency-bearing region;
    at least one masking element mounted and configured for movement with respect to the viewing surface, which masks an adjustable area of the viewing field leaving a field of view, including at least part of the transparency bearing region, unmasked;

a motor for moving the at least one masking element; and at least one reflective element, additional to the interior reflective surface, attached to the masking element such that when the masking element moves the at least one reflective element moves together with the masking element and the at least one reflective element directs at least part of the light from the masked area to the field of view;

wherein the at least one reflective element comprises at least one movable reflective curtain which moves in a given direction.

19. A device according to claim 18 wherein the at least one movable reflective curtain is angled to direct light in a generally central direction.

20. A device according to claim 18 wherein the at least one reflective element comprises a reflective coating on a surface of the at least one movable masking element.

21. A device according to claim 20 wherein the reflective element has a specular reflection.

22. A device according to claim 20 wherein the reflective element has a light diffusing reflection.

* * * * *